(12) United States Patent
Nakano et al.

(10) Patent No.: US 11,190,950 B2
(45) Date of Patent: Nov. 30, 2021

(54) COMMUNICATION SYSTEM, COMMUNICATION MANAGEMENT METHOD, AND NETWORK MANAGEMENT APPARATUS

(71) Applicant: HITACHI, LTD., Tokyo (JP)

(72) Inventors: Ryo Nakano, Tokyo (JP); Yuichi Igarashi, Tokyo (JP); Takuma Nishimura, Tokyo (JP)

(73) Assignee: HITACHI, LTD., Tokyo (JP)

( * ) Notice: Subject to any disclaimer, the term of this patent is extended or adjusted under 35 U.S.C. 154(b) by 357 days.

(21) Appl. No.: 16/468,474

(22) PCT Filed: Dec. 22, 2017

(86) PCT No.: PCT/JP2017/046092
§ 371 (c)(1),
(2) Date: Jun. 11, 2019

(87) PCT Pub. No.: WO2018/117252
PCT Pub. Date: Jun. 28, 2018

(65) Prior Publication Data
US 2021/0289365 A1 Sep. 16, 2021

(30) Foreign Application Priority Data

Dec. 22, 2016 (JP) .............................. JP2016-249299

(51) Int. Cl.
*H04W 16/18* (2009.01)
*H04B 17/309* (2015.01)
*H04B 17/40* (2015.01)
*H04B 7/26* (2006.01)

(52) U.S. Cl.
CPC .......... *H04W 16/18* (2013.01); *H04B 7/2606* (2013.01); *H04B 17/309* (2015.01); *H04B 17/401* (2015.01)

(58) Field of Classification Search
CPC ... H04W 16/18; H04B 7/2606; H04B 17/401; H04B 17/309
See application file for complete search history.

(56) References Cited

U.S. PATENT DOCUMENTS

| 2006/0056329 A1* | 3/2006 | Ookuma ................ H04B 7/155 370/315 |
| 2009/0088070 A1* | 4/2009 | Aaron ................ H04W 72/085 455/7 |

(Continued)

FOREIGN PATENT DOCUMENTS

| DE | 102008043864 A1 | 5/2010 |
| JP | 2006-081077 A | 3/2006 |

(Continued)

OTHER PUBLICATIONS

Extended European Search Report dated May 12, 2020 for the European Patent Application No. 17884111.0.

(Continued)

*Primary Examiner* — Tejis Daya
(74) *Attorney, Agent, or Firm* — Volpe Koenig

(57) ABSTRACT

A communication system includes: storage to store location information of each of a plurality of devices capable of wireless multi-hop communication, site configuration information including location and size information of an obstacle present at a site of the plurality of devices, and communication quality information between devices; a determination unit determines whether a repeater needs to be added for each of the plurality of devices, based on communication quality information; and a decision unit calculates an expected value related to attenuation of received power between the first and second devices caused by the obstacle, and decides a location for the determination unit to add the repeater based on location information of the first device determined, location information of the second (Continued)

device different from the first device and communicated with the first device through the repeater, the communication quality information between the first and second device, and the site configuration information.

11 Claims, 16 Drawing Sheets

(56) References Cited

U.S. PATENT DOCUMENTS

2010/0014491 A1     1/2010   Lee et al.
2017/0310590 A1* 10/2017   Diancin ................ H04L 67/125

FOREIGN PATENT DOCUMENTS

| JP | 4420218 B2 | 12/2009 |
| JP | 2016-184898 A | 10/2016 |
| WO | 2014/104454 A1 | 7/2014 |
| WO | 2014/121136 A1 | 8/2014 |

OTHER PUBLICATIONS

Communication pursuant to Article 94(3) EPC dated Nov. 12, 2020 for European Patent Application No. 17884111.0.
International Search Report, PCT/JP2017/046092, dated Mar. 20, 2018, 1 pg.
Chinese Office Action dated Aug. 25, 2021 for Chinese Patent Application No. 201780074424.4.

\* cited by examiner

FIG. 5

| MEASUREMENT SOURCE | MEASUREMENT DESTINATION | RECORDED TIME | COMMUNICATION QUALITY |
|---|---|---|---|
| A | GW | 20160222081030 | -65 |
| A | B | 20160222081035 | -70 |

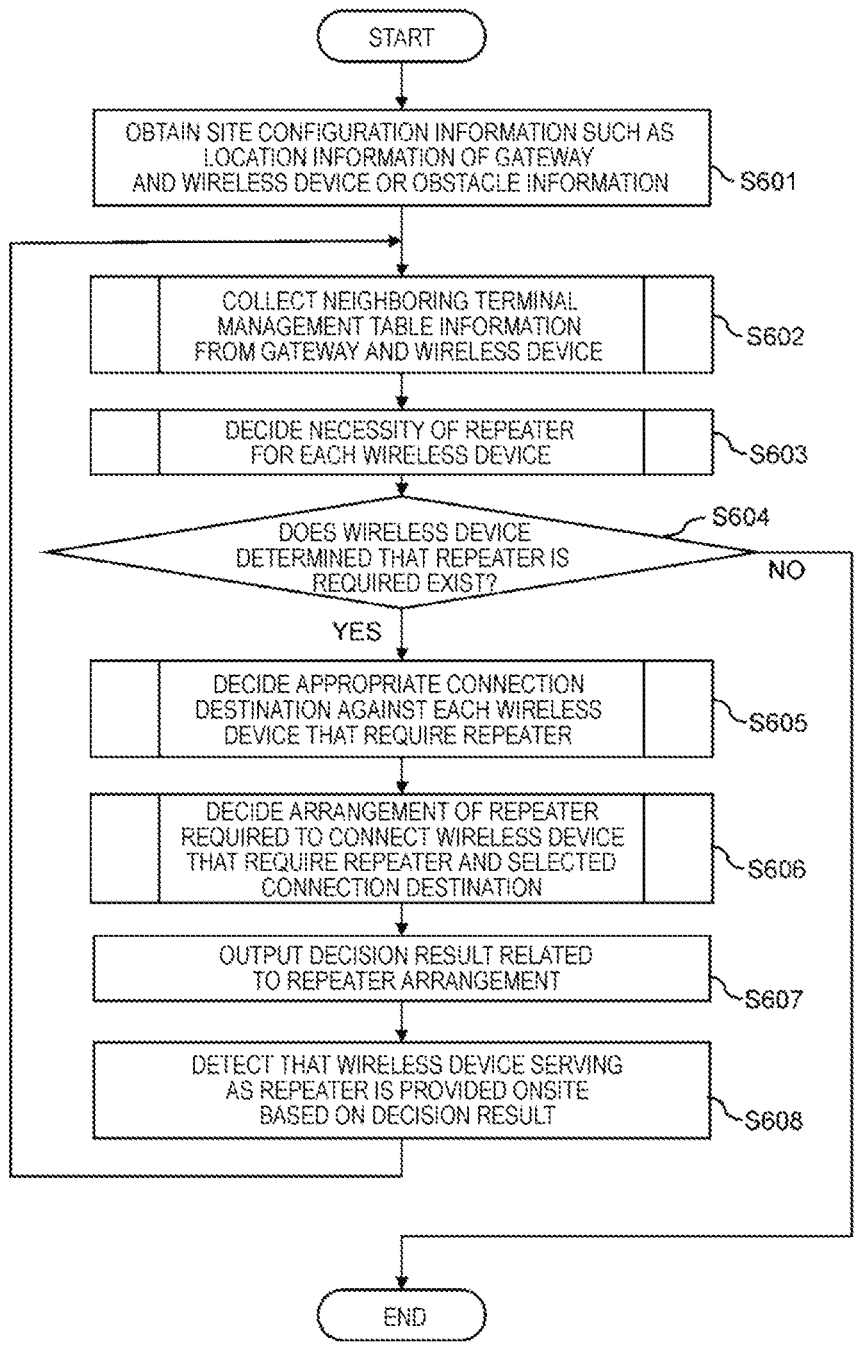

COMMUNICATION SYSTEM, COMMUNICATION MANAGEMENT METHOD, AND NETWORK MANAGEMENT APPARATUS

BACKGROUND OF THE INVENTION

1. Field of the Invention

The present invention relates to a communication system, a communication management method, and a network management apparatus, and is suitably applied to, for example, a communication system including a plurality of devices capable of wireless multi-hop communication.

2. Description of Related Art

With the progress in diversifying the network usage, there has been the progress in introducing a communication system having a form in which data collection is performed via communication between wireless devices by accommodating a plurality of wireless devices under a gateway and constructing a wireless multi-hop network. However, there may be cases in which communication with another wireless device is not possible due to radio wave shielding or the like by an obstacle at the site even when a wireless device is provided at the site, or in which communication quality is poor and desired communication requirements are not achievable even when communication is possible. In this case, in order to secure communication connection, promote stabilization of communication quality, and the like, an engineering operation of adding a wireless device operating as a repeater to an appropriate place is required.

As a technology for determining an arrangement location of a repeater, a technology of detecting a wireless device connectable in one hop regarding arrangement location candidates of a predetermined repeater and determining an arrangement location of an excellent repeater among the candidates based on a detection result has been disclosed (see Japanese Patent No. 44202018). According to the technology, a location connectable to both a wireless device having a communication path up to a gateway and a wireless device in an isolated state in one hop is selected among the arrangement location candidates, and is employed as the actual arrangement location of the repeater. The current process is repeated until there is no wireless device in an isolated state, and the repeater arrangement, in which all desired wireless devices have a communication path to the gateway, may be determined.

However, in the technology specified in Japanese Patent No. 44202018, in which information about the arrangement location candidates of the repeater is required, it is required to pre-select a plurality of arrangement location candidates. For example, when the repeater is driven by a power source, locations capable of power supply may be narrowed down as candidates, but when there is a degree of freedom in the arrangement location, such as battery driving, it is required to examine suitable arrangement location candidates of the repeater while taking into consideration a radio wave propagation characteristic by an obstacle at the site. When a suitable arrangement location does not exist in the selected candidates, it is required to re-select the arrangement location candidates. Since it is required to actually install a wireless device regarding each arrangement location candidate of a repeater and detect a wireless device connectable in one hop, time and efforts are accompanied in performing a detection procedure when there are a plurality of candidate points.

SUMMARY OF THE INVENTION

The present invention provides a communication system, a communication management method, and a network management apparatus, in which an arrangement location of a repeater considering radio wave propagation characteristic at the site may be appropriately calculated without the need for prior information about an arrangement location candidate of the repeater.

According to an aspect of the present invention, there is provided a communication system including a plurality of devices capable of wireless multi-hop communication, the communication system including: a storage unit configured to store location information of each of the plurality of devices, site configuration information including location information and size information of an obstacle present at a site where the plurality of devices are provided, and communication quality information between devices of the plurality of devices; a determination unit configured to determine whether a repeater is required to be added for each of the plurality of devices, based on the communication quality information; and a decision unit configured to calculate an expected value related to attenuation of received power between a first device and a second device caused by the obstacle present at the site and decide a location at which the repeater is arranged, based on location information of the first device determined that the repeater is required to be added by the determination unit, location information of the second device different from the first device and communicated with the first device through the repeater, the communication quality information between the first device and the second device, and the site configuration information.

According to another aspect of the present invention, there is provided a communication management method of a communication system including a plurality of devices capable of wireless multi-hop communication and a storage unit configured to store location information of each of the plurality of devices, site configuration information including location information and size information of an obstacle present at a site where the plurality of devices are provided, and communication quality information between devices of the plurality of devices, the communication management method including: determining, by a determination unit, whether a repeater is required to be added for each of the plurality of devices based on the communication quality information; and calculating, by a decision unit, an expected value related to attenuation of received power between a first device and a second device caused by the obstacle present at the site and deciding, by the decision unit, a location at which the repeater is arranged, based on location information of the first device determined that the repeater is required to be added by the determination unit, location information of the second apparatus different from the first device and communicated with the first device through the repeater, the communication quality information between the first device and the second device, and the site configuration information.

According to another aspect of the present invention, there is provided a network management apparatus for managing a network configured by including a plurality of devices capable of wireless multi-hop communication, the network management apparatus including: a storage unit configured to store location information of each of the plurality of devices, site configuration information including location information and size information of an obstacle present at a site where the plurality of devices are provided, and communication quality information between devices of the plurality of devices; a determination unit configured to determine whether a repeater is required to be added for each of the plurality of devices, based on the communication quality information; and a decision unit configured to calculate an expected value related to attenuation of received power between a first device and a second device caused by the obstacle present at the site and decide a location at which the repeater is arranged, based on location information of the first device determined that the repeater is required to be added by the determination unit, location information of the second device different from the first device and communicated with the first device through the repeater, the communication quality information between the first device and the second device, and the site configuration information.

According to the present invention, a location at which a repeater is to be arranged is determined based on location information and communication quality information of a first device determined to additionally require a repeater, location information of a second device to be communicated with the first device via a repeater, and site configuration information.

According to the present invention, an arrangement location of a repeater may be appropriately calculated in consideration of a radio wave propagation characteristic of a site.

BRIEF DESCRIPTION OF THE DRAWINGS

FIG. 5 is a diagram illustrating a neighboring terminal management table stored and maintained by the wireless device and the gateway;

FIG. 6 is a flowchart illustrating main processes related to an arrangement design of a repeater;

DESCRIPTION OF EMBODIMENTS

Figure 1:
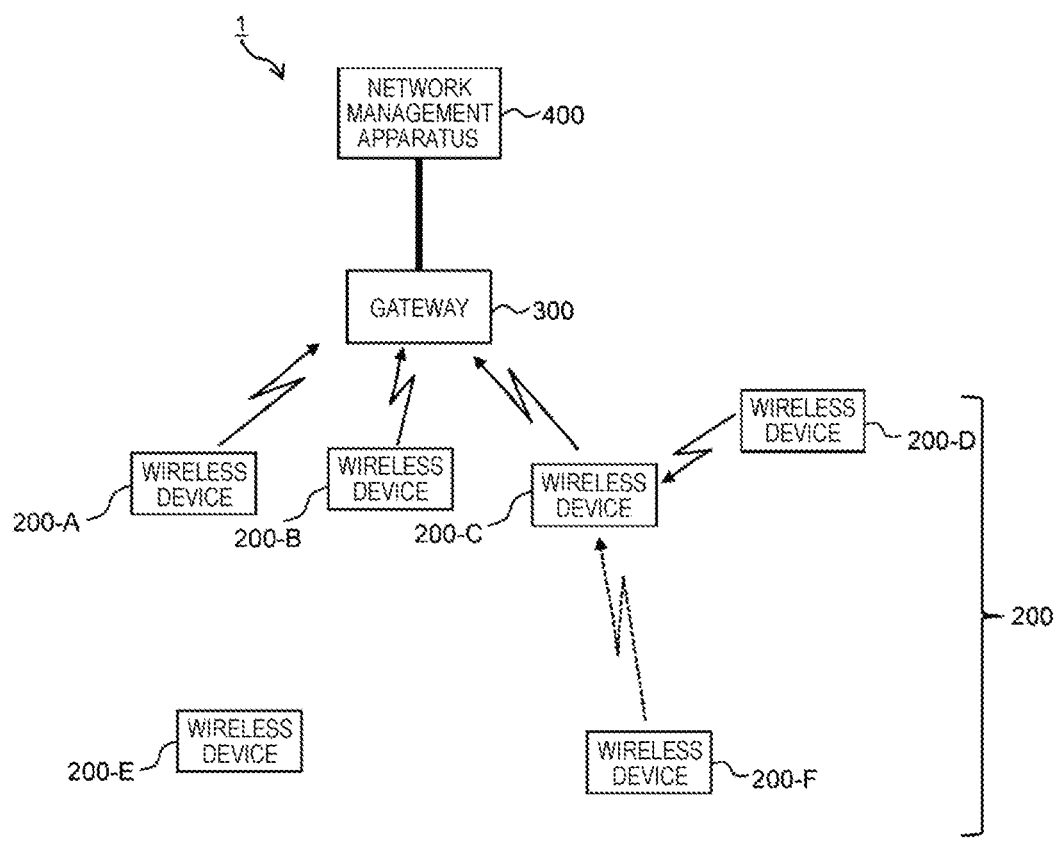
FIG. 1 is a block diagram illustrating a configuration of a communication system according to a first embodiment.

Hereinafter, a first embodiment of the present invention will be described with reference to the drawings.

(1) First Embodiment (1-1) Introduction

In a communication system of the present embodiment, a wireless device and a gateway respectively manage information of a partner terminal capable of direct communication in one hop (without a repeater) and communication quality information with the partner terminal. Hereinafter, a table used for such management is referred to as a neighboring terminal management table. In the communication system, a network configuration management unit collects information of the neighboring terminal management table from the wireless device and the gateway, and manages the communication quality information between the wireless devices and between the wireless device and the gateway. In the communication system, a site configuration information management unit manages, based on an input by a network construction operator or the like, location information of the wireless device, location information of the gateway, and site configuration information, such as a location, a size, and the like of an obstacle present at a site.

In the communication system, a repeater necessity decision unit decides the necessity of adding a repeater for each wireless device, based on management information (communication quality information or the like) of the network configuration management unit. Here, a wireless device that does not satisfy predetermined communication requirements and a wireless device that does not have certain redundancy regarding communication connection may be decided that a repeater is required to be added. In particular, the repeater necessity decision unit decides following wireless devices of (1) to (3) as wireless devices that require addition of a repeater.

(1) A wireless device in an isolated state, in which a partner terminal capable of direct communication in one hop does not exist (2) A wireless device in which a partner terminal capable of direct communication in one hop and having communication quality equal to or greater than a threshold value does not exist (3) A wireless device in which a partner terminal capable of direct communication in one hop and having communication quality equal to or greater than a threshold value exists, but the number of corresponding terminals is less than N (N is an arbitrary value equal to or greater than 1)

In the communication system, a connection destination decision unit decides a wireless device or a gateway that is an appropriate connection destination so as to secure communication connection and achieve improvement and stabilization of communication quality against each wireless device determined that a repeater is required to be added. In particular, the connection destination decision unit decides a connection destination, based on following criteria of (A) to (C), of a wireless device determined that a repeater is required to be added under conditions of (1) to (3).

(A) A wireless device or a gateway having a smallest expected value of attenuation of received power based on site configuration information (B) A wireless device or a gateway having optimum communication quality among partner terminals capable of direct communication in one hop (C) When excluding a partner terminal capable of direct communication in one hop and having communication quality equal to or greater than a threshold value, a wireless device or a gateway determined according to the criterion of (A) when (1) and determined according to the criterion of (B) when (2)

Here, regarding the decision of (A), when an obstacle exists between the wireless device determined that a repeater is required to be added and another wireless device or the gateway, the connection destination decision unit calculates a value of attenuation of received power caused by the obstacle and decides whether the obstacle passes (transmits) or bypasses radio waves, based on an actual measurement value of the communication quality information managed by the network configuration management unit and a theoretical value calculated from the location information of the wireless device or the gateway. The connection destination decision unit determines the wireless device or the gateway as the connection destination, based on the expected value of the attenuation of the received power at this time.

In the communication system, a repeater arrangement decision unit decides an arrangement location (installation location) of a repeater required to connect each wireless device determined by the repeater necessity decision unit that a repeater is required and the connection destination selected by the connection destination decision unit. In particular, the repeater arrangement decision unit calculates communication ranges expected for both the wireless device decides that the repeater is required and the connection destination, and decides an overlapping region of the communication ranges as a recommended arrangement location of the repeater. At this time, when the obstacle exists between the wireless device that the repeater is required and the connection destination, the repeater arrangement decision unit decides, based on the decision of (A), a repeater arrangement passing radio waves or a repeater arrangement bypassing radio waves against the obstacle. Then, the communication system outputs a decision result through a display device or the like, as the recommended arrangement location of the repeater.

As such, by deciding the necessity of the repeater of each wireless device, selecting the appropriate connection destination, and deciding the repeater arrangement, based on the communication quality information between the wireless devices and between the wireless device and the gateway, and the site configuration information, it is possible to calculate and propose the recommended arrangement location of the repeater in consideration of a radio wave propagation characteristic of the site without having to require prior information about an arrangement location candidate of the repeater. Since an operation of actually providing the wireless device for all arrangement location candidates of the repeater and detecting the wireless device connectable in one hop becomes unnecessary, it is possible to reduce the workload related to an arrangement design of the repeater.

Hereinafter, the first embodiment according to operation support of engineering in a wireless multi-hop network related to an arrangement design of a repeater will be described with reference to FIGS. 1 through 15B, and a second embodiment will be described with reference to FIG. 16.

In the first embodiment, first, configurations of a communication system, a wireless device, a gateway, and a network management apparatus will be described with reference to FIGS. 1 to 4. Then, a neighboring terminal management table will be described with reference to FIG. 5. Next, processes of the network management apparatus for engineering support in a wireless multi-hop network related to an arrangement design of a repeater, operation examples thereof, and subsidiary screen display examples will be descried with reference to FIGS. 6 through 15B.

(1-2) Configuration of Communication System

In FIG. 1, the reference numeral 1 generally indicates a communication system according to the first embodiment. The communication system 1 includes a plurality of wireless devices 200 (wireless devices 200-A through 200-F), a gateway 300, and a network management apparatus 400. For example, collected data (a sensor value such as a temperature, pressure, or the like) obtained by a measuring device connected to the wireless device 200 or by the wireless device 200 having a measuring function is transmitted to the gateway 200 via wireless communication. At this time, when the wireless device 200 is unable to directly communicate with the gateway 300, data is transmitted to the gate 300 in a bucket brigade manner by relaying the other wireless device 200 via wireless multi-hop communication. Then, the gateway 300 transmits data collected from the wireless device 200 to the network management apparatus 400.

In FIG. 1, the gateway 300 is connected to the network management apparatus 400 via wires or wirelessly, but the gateway 300 and the network management apparatus 400 may not be separated, but functions of the network management apparatus 400 may be integrated with the gateway 300 to configure a single apparatus. Some of the functions of the network management apparatus 400 may be realized by another apparatus (which may be the gateway 300 or another apparatus).

In FIG. 1, a link having poor communication quality and is unable to achieve a predetermined communication requirement is indicated by a dashed line. In particular, the wireless device 200-F is communicable with the wireless device 200-C, but is unable to achieve a communication requirement. In FIG. 1, the wireless device 200-E is unable to achieve a communication requirement since there is no communicable wireless device around. The wireless device 200-E and the wireless device 200-F need to secure stable communication connection by adding a repeater to an appropriate location. In this respect, in the communication system 1, since an arrangement location of a repeater required by the wireless device 200-E and the wireless device 200-F is calculated according to processing procedure illustrated in FIG. 6 described later, and the repeater may be added to an appropriate location, stable communication connection may be secured.

(1-3) Configuration of Wireless Device

Figure 2:
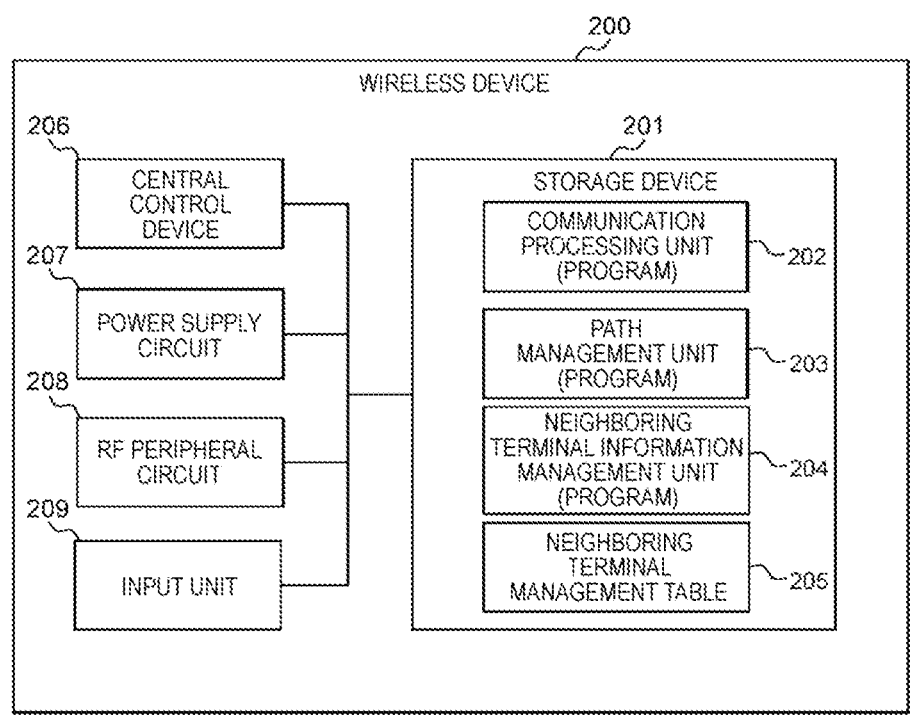
FIG. 2 is a block diagram illustrating a hardware configuration of a wireless device.

A configuration of the wireless device 200 will be described with reference to FIG. 2. FIG. 2 illustrates a hardware configuration of the wireless device 200 in the communication system 1. The wireless device 200 is an embedded device having a communication function with the gateway 300 or another wireless device 200.

In FIG. 2, the wireless device 200 includes a storage device 201, a central control device 206, a power supply circuit 207, a radio frequency (RF) peripheral circuit 208, and an input unit 209. The storage device 201 includes a storage device including a read-only semiconductor memory or the like, a storage device including a rewritable semiconductor storage device or the like, and the like, and stores a computer program implementing various processes (functions), data corresponding to management information, and the like. For example, the storage device 201 stores a communication process program, a path management program, a neighboring terminal information management program, and a neighboring terminal management table 205. When the central control device 206 performs the program or the like stored in the storage unit 201, various functions (a communication processing unit 202, a path management unit 203, a neighboring terminal information management unit 204, and the like) of the wireless device 200 are performed.

The communication processing unit 202 performs transmission and reception processes in communication. In particular, a packet assembly process of transmission destination designation during transmitting, a packet analysis process including determination of whether a packet is transmitted to its own terminal during receiving, and the like are performed. The path management unit 203 manages path information in communication in a network. The neighboring terminal information management unit 204 manages information about the other wireless device 200 and the gateway 300 present in a communication range of the wireless device 200 and information about communication quality with each communication partner device (communication target), and performs an update process of the neighboring terminal management table 205, a notification process of neighboring terminal information, and the like.

The central control device 206 is a controller, such as a central processing unit (CPU), a microcomputer, or the like, and performs various processes. The power supply circuit 207 supplies power to the wireless device 200, thereby operating the wireless device 200. A power supply source is not limited to a particular power source, such as an external power source, a battery mounted on the wireless device 200, or the like. The RF peripheral circuit 208 includes a transmitting unit that converts digital data generated by mutually converting a digital signal and a wireless signal to a wireless signal and transmitting the wireless signal to the other wireless device 200, the gateway 300, or the like, and a receiving unit that extracts the digital data from the wireless signal received from the other wireless device 200, the gateway 300, or the like. The input unit 209 receives an input, such as a measurement value or the like, from various sensors connected to the wireless device 200.

The wireless device 200 is not limited to a built-in device, and may be an independent apparatus. An input unit is not limited to an interface with a sensor, and may be various sensors. A wireless device added as a repeater may have the same configuration as the wireless device 200, but may not necessarily include all components of FIG. 2. For example, the wireless device may not include the input unit 209 or may include a sensor instead of the input unit 209.

(1-4) Configuration of Gateway

Figure 3:
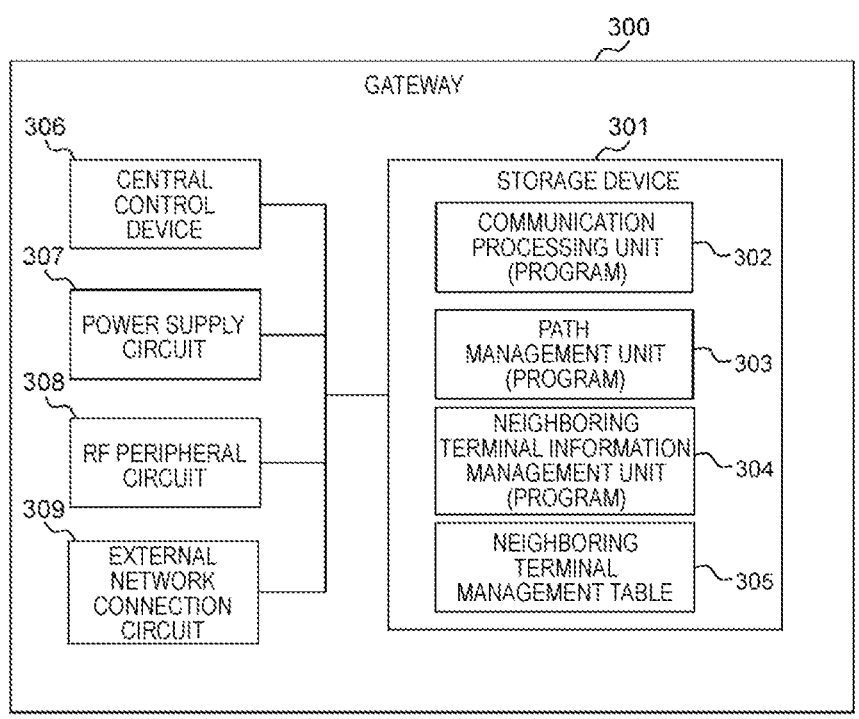
FIG. 3 is a block diagram illustrating a hardware configuration of a gateway.

A configuration of the gateway 300 will be described with reference to FIG. 3. FIG. 3 illustrates a hardware configuration of the gateway 300 in the communication system 1. The gateway 300 includes a storage device 301, a central control device 306, a power supply circuit 307, an RF peripheral circuit 308, and an external network connection circuit 309. The storage device 301 stores a communication process program, a path management program, a neighboring terminal information management program, and a neighboring terminal management table 305. When the central control device 306 executes the program and the like stored in the storage device 301, various functions (a communication processing unit 302, a path management unit 303, a neighboring terminal information management unit 304, and the like) of the gateway 300 are implemented. Since the gateway 300 has the same configuration as the wireless device 200 except that the gateway 300 includes the external network connection circuit 309 and does not include the input unit 209, detailed descriptions of the storage device 301, the central control device 306, the power supply circuit 307, and the RF peripheral circuit 308 will be omitted.

The gateway 300 communicates with the wireless device 200 by using the RF peripheral circuit 308 and communicates with the network management apparatus 400 by using the external network connection circuit 309. The external network connection circuit 309 is a function for using an external network, such as Ethernet (registered trademark), Wi-Fi (registered trademark), an optical line, a telephone network, or the like. However, when the network management apparatus 400 is integrated with the gateway 300 to be configured as a single apparatus or the like, the external network connection circuit 309 may not be necessarily mounted thereon.

(1-5) Configuration of Network Management Apparatus

Figure 4:
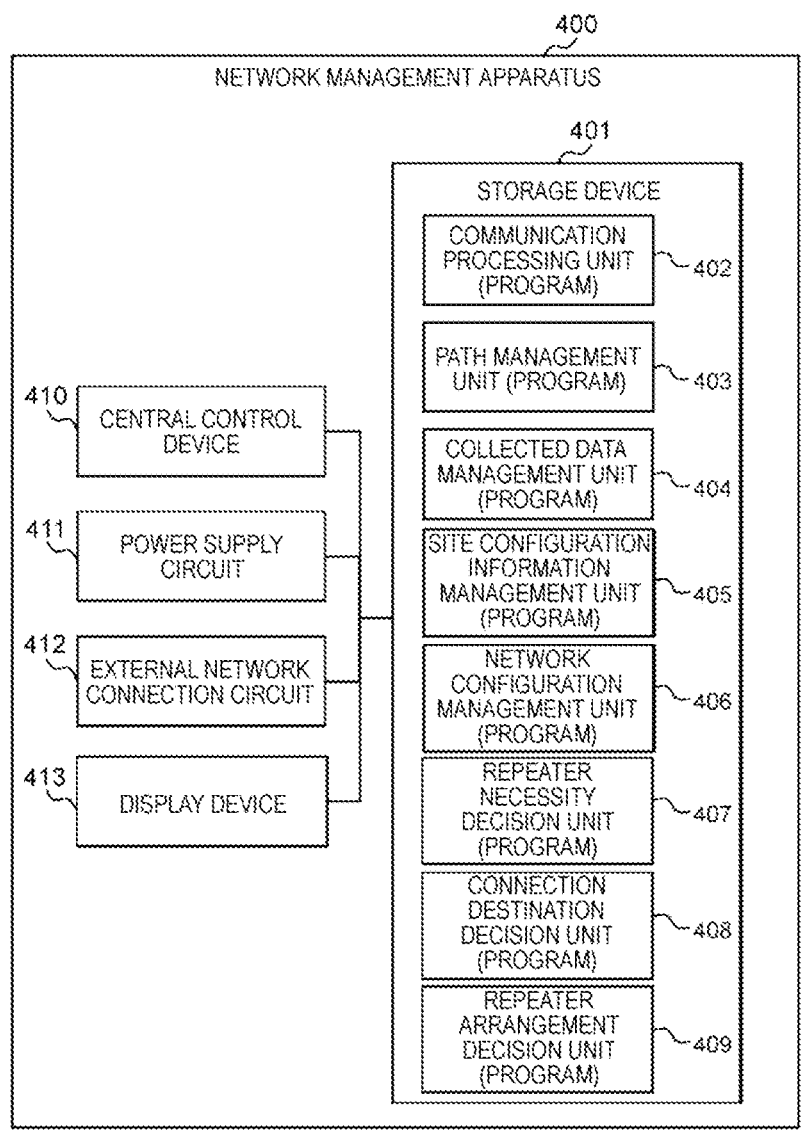
FIG. 4 is a block diagram illustrating a hardware configuration of a network management apparatus.

A configuration of the network management apparatus 400 will be described with reference to FIG. 4. FIG. 4 illustrates a hardware configuration of the network management apparatus 400 in the communication system 1. The network management apparatus 400 includes a storage device 401, a central control device 410, a power supply circuit 411, an external network connection circuit 412, and a display device 413. The storage device 401 stores a communication process program, a path management program, a collected data management program, a site configuration information management program, a network configuration management program, repeater necessity decision program, a connection destination decision program, and a repeater arrangement decision program. When the central control device 410 executes the program or the like stored in the storage device 401, various functions (a communication processing unit 402, a path management unit 403, a collected data management unit 404, a site configuration information management unit 405, a network configuration management unit 406, a repeater necessity decision unit 407, a connection destination decision unit 408, a repeater arrangement decision unit 409, and the like) of the network management apparatus 400 are implemented. Since the communication processing unit 402, the path management unit 403, the central control device 410, the power supply circuit 411 and the external network connection circuit 412 are the same configuration as the wireless device 200, detailed descriptions thereof will be omitted.

In FIG. 4, the collected data management unit 404 manages data, such as a sensor value or the like, collected from the wireless device 200. The site configuration information management unit 405 manages (stores) location information of the wireless device 200 and the gateway 300, location information and size information of an obstacle present at the site, material information of the obstacle if known. The network configuration management unit 406 manages (stores) information (neighboring terminal management table information) of the neighboring terminal management table 205 of the wireless device 200 and the neighboring terminal management table 305 of the gateway 300, and manages (stores) a link between wireless devices present in a network, a link between a wireless device and a gateway, and respective communication quality (communication quality information).

The repeater necessity decision unit 407 decides necessity (repeater addition necessity) of adding a repeater against each wireless device 200, based on the neighboring terminal management table information or the like managed by the network configuration management unit 406, and selects the wireless device 200 to which a repeater needs to be added, based on a decision result.

The connection destination decision unit 408 decides the wireless device 200 or the gateway 300 that is an appropriate connection destination against the wireless device 200 decided by the repeater necessity decision unit 407 that a repeater is required to be added. For example, the connection destination decision unit 408 decides a connection destination required to secure predetermined communication quality (communication quality equal to or greater than a threshold value) against the wireless device 200 selected by the repeater necessity decision unit 407, based on the communication quality information and the site configuration information, and selects the connection destination among the wireless device 200 and the gateway 300, based on a decision result.

The repeater arrangement decision unit 409 decides an arrangement location of a repeater, which is required to connect the wireless device 200 decided by the repeater necessity decision unit 407 that a repeater is required to be added and the wireless device 200 or the gateway 300 decided by the connection destination decision unit 408 to be the appropriate connection destination. For example, the repeater arrangement decision unit 409 decides whether an arrangement location indicating an installation range of a repeater for relaying the wireless device 200 selected by the repeater necessity decision unit 407 and the connection destination selected by the connection destination decision unit 408 exists based on the a communication range of the wireless device 200 selected by the repeater necessity decision unit 407, a communication range of the connection destination selected by the connection destination decision unit 408, and the site configuration information, and outputs a decision result.

The display device 413 is a liquid crystal display device or the like, and displays communication quality between the wireless devices 200 present in the network, communication quality between the wireless device 200 and the gateway 300, the arrangement location of the repeater decided by the repeater arrangement decision unit 409, or the like. The display device 413 may be a configuration provided in the network management apparatus 400 or a configuration connected from the outside.

Functions of the network management apparatus 400 may be integrated with the gateway 300 to be integrated as a single apparatus, or the functions of the network management apparatus 400 may be mounted on the gateway 300. When the network management apparatus 400 and the gateway 300 are isolated as illustrated in FIG. 1, both the network management apparatus 400 and the gateway 300 may be provided at the site, or the gateway 300 may be provided at the site while the network management apparatus 400 is provided at another site on the cloud, or the like.

(1-6) Configuration of Neighboring Terminal Management Table

The neighboring terminal management table will be described with reference to FIG. 5. FIG. 5 illustrates a configuration of the neighboring terminal management tables 205 and 305 stored and maintained by the wireless device 200 and the gateway 300 in the communication system 1. The neighboring terminal management table illustrated in FIG. 5 is managed by the neighboring terminal information management unit 304 of the wireless device 200 and the neighboring terminal information management unit 304 of the gateway 300 such as to manage information about a partner terminal capable of direct communication with itself among the wireless device 200 and the gateway 300 present in the network, and communication quality with each communication partner device (communication target).

A measurement source 501 indicates a measurement source of communication quality, that is, an identifier of the wireless device 200 or the gateway 300 serving as a management source of the neighboring terminal management table 205 or the neighboring terminal management table 305. In particular, the measurement source 501 is a field in which an address, a host name, or the like of the wireless device 200 or the gateway 300 is described, and an identifier described in this field may conform to a method employed by the communication system 1. When the wireless device 200 and the gateway 300 are identified by an IP address, a MAC address, or a unique identifier, such an identifier may be described. In the example of FIG. 5, the neighboring terminal management table 205 managed by the wireless device 200-A is illustrated by indicating the identifier of the wireless device 200 by a suffix portion of FIG. 1 and indicating the identifier of the gateway 300 by "GW".

A measurement destination 502 indicates an identifier of a partner terminal capable of directly communication with the measurement source 501. In the example of FIG. 5, it is indicated that the wireless device 200-A is directly communicable with the gateway 300 and the wireless device 200-B.

A recorded time 503 indicates a time at which the wireless device 200 or the gateway 300 of the measurement source 501 recorded communication quality with the partner terminal described in the measurement destination 502. In the example of FIG. 5, a recorded time is indicated in a form of "year-month-day-hour-minute-second", but the recorded time is not limited to this form and may be in another form.

Communication quality 504 indicates communication quality between the wireless device 200 or gateway 300 of the measurement source 501 and the partner terminal described in the measurement destination 502. In the example of FIG. 5, received radio wave strength (hereinafter, referred to as a received signal strength indicator (RSSI)) at a time when the wireless device 200 or the gateway 300 of the measurement source 501 received a packet from the partner terminal described in the measurement destination 502 is illustrated. Although not described in FIG. 5, a field in which RSSI is recorded for arbitrary N times according to capacity of a storage area may be provided in the neighboring terminal management tables 205 and 305 of the wireless device 200 and the gateway 300. Statistical information, such as an average value, a maximum value, a minimum value, and the like of RSSI observed in the past, may be managed according to neighboring terminal management tables 205 and 305. In FIG. 5, although an RSSI is cited as an indication representing communication quality, but the indication is not limited thereto, and a configuration in which information of a packet loss rate or the like is added and managed may be the indication of the communication quality and a plurality of indications of communication quality may be managed by the neighboring terminal management tables 205 and 305.

(1-7) Processes and the like in Communication System

An overall flow of engineering support in a wireless multi-hop network related to an arrangement design of a repeater will be described with reference to FIG. 6. FIG. 6 illustrates a processing procedure of main processes related to an arrangement design of a repeater in the communication system 1.

(1-7-1) Main Processes

According to processes of FIG. 6, the network management apparatus 400 decides necessity of adding a repeater against each wireless device 200, based on information of the neighboring terminal management tables 205 and 305 collected from each wireless device 200 and gateway 300, and decides the wireless device 200 or the gateway 300 serving as an appropriate connection destination against the wireless device 200 decided that a repeater is required. Then, the network management apparatus 400 decides an arrangement location of a repeater required to connect the wireless device 200 decided that a repeater is required and the connection destination, and displays a decision result via the display device 413 as a recommended arrangement location of a repeater.

Figure 7A:
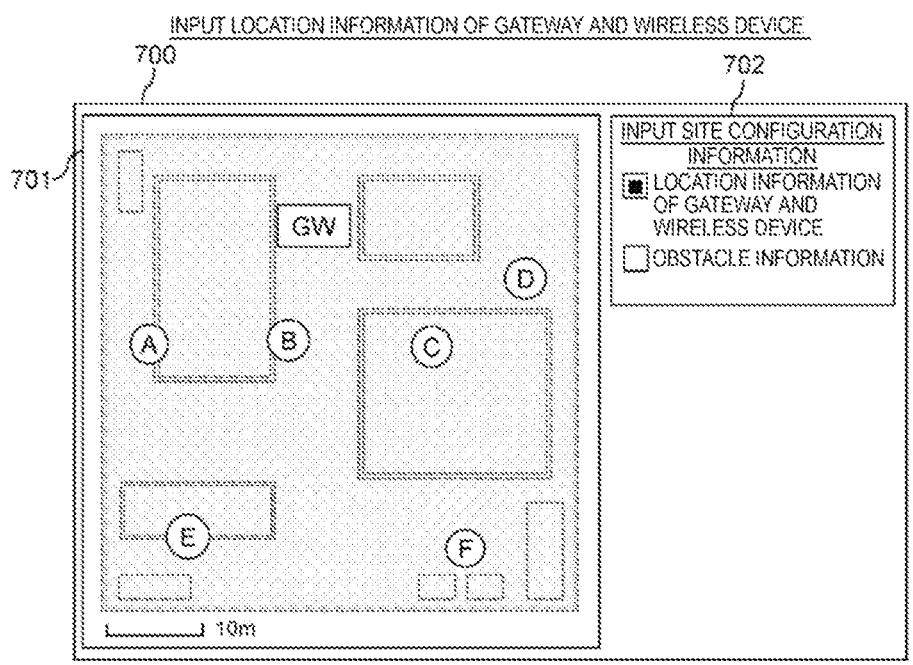
FIGS. 7A and 7B are diagrams illustrating input screens for inputting site configuration information.
Figure 7B:
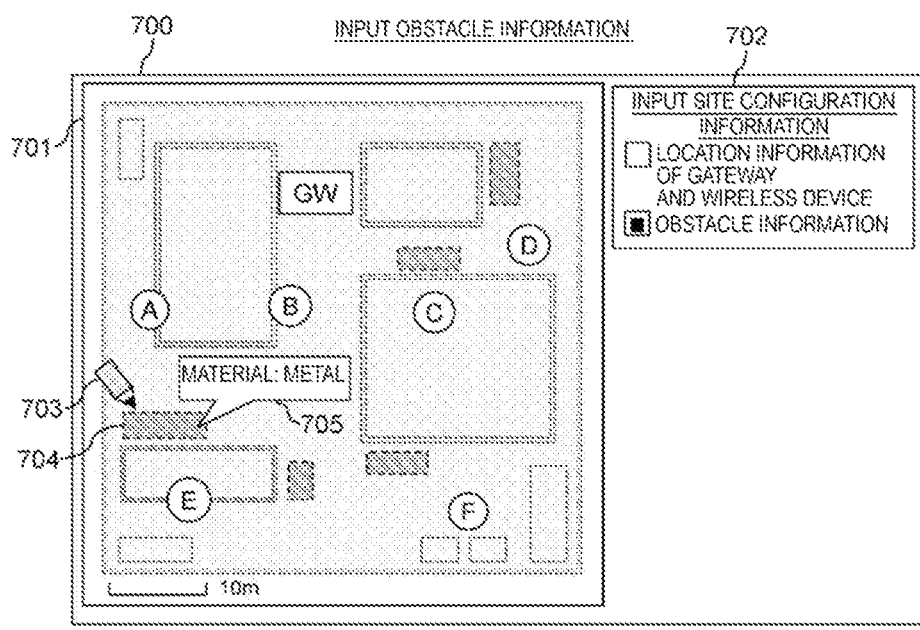

In particular, when site configuration information, such as location information of the gateway 300 and the wireless device 200, obstacle information (location information, size information, and the like of an obstacle), and the like, is input through an input screen 700 illustrated in FIGS. 7A and 7B, the network management apparatus 400 obtains the site configuration information (step S601).

The input screen 700 may be displayed on the display device 413 or may be displayed on another device. When the input screen 700 is displayed on the display device 413, the network management apparatus 400 includes an input device (not illustrated), such as a mouse, a keyboard, a touch panel, or the like, and an input operation is performed through the input device. In the current embodiment, as an example of an input method by an operator performing engineering of the wireless multi-hop network, an example of inputting the site configuration information through the display device 413 of the network management apparatus 400 will be described below with reference to FIGS. 7A and 7B. However, the inputting of the site configuration information is not limited to a certain method, and for example, location information may be automatically input when the wireless device 200, the gateway 300, or the like includes a global positioning system (GPS), when location information about an arrangement location is provided in advance, and when actual latitude information and longitude information are provided. The obstacle information of the obstacle present at the site may also be automatically input when the site configuration information or the like is already known. When step S601 is completed, the network management apparatus 400 performs step S602.

In step S602, the network management apparatus 400 collects information of the neighboring terminal management tables 205 and 305 from the gateway 300 and the wireless device 200. A collecting process of step S602 will be described in detail later with reference to FIG. 8. By collecting the information of the neighboring terminal management tables 205 and 305 stored and maintained by the gateway 300 and the wireless device 200, the network management apparatus 400 is able to manage a partner terminal communicable with the gateway 300 and the wireless device 200 and each communication quality, as network configuration information. When step S602 is completed, the network management apparatus 400 performs step S603.

In step S603, the network management apparatus 400 decides necessity of adding a repeater to each wireless device 20, based on communication quality information between the wireless devices 200 and between the wireless device 200 and the gateway 300. In step S603, the wireless device 200 that requires securement of communication connection, stabilization of communication quality, or the like by adding a repeater, for example, the wireless device 200 unable to achieve a communication requirement with a network configuration at the time, is extracted. A repeater necessity decision process of step S603 will be described in detail later with reference to FIG. 10. When step S603 is completed, the network management apparatus 400 performs step S604.

In step S604, the network management apparatus 400 decides whether the wireless device 200 decided that a repeater is required to be added exists, based on a decision result of step S603. When it is decided that the wireless device 200 decided that a repeater is required to be added exists (when YES), the network management apparatus 400 performs step S605, and when it is decided that the wireless device 200 does not exist (when NO), the main processes are ended because all wireless devices 200 are capable of achieving a predetermined communication requirement and addition of a repeater is not necessary.

In step S605, the network management apparatus 400 decides the wireless device 200 or the gateway 300 serving as an appropriate connection destination against the wireless device 200 decided that a repeater is required in step S603. A connection destination decision process of step S605 will be described in detail later with reference to FIG. 11. When step S605 is completed, the network management apparatus 400 performs step S606.

In step S606, the network management apparatus 400 decides an arrangement location of a repeater required to connect the wireless device 200 decided that a repeater is required in step S603 and the connection destination decided in step S605. By performing a repeater arrangement decision process of step S606, it is possible to calculate a recommended arrangement location of a repeater even in an environment in which an arrangement location candidate of a repeater is not pre-provided. The repeater arrangement decision process of step S606 will be described in detail later with reference to FIG. 13. When step S606 is completed, the network management apparatus 400 performs step S607.

In step S607, the network management apparatus 400 displays a decision result obtained in step S606 on the display device 413. The operator performing engineering of the wireless multi-hop network may easily determine where to additionally provide the wireless device 200 serving as a repeater, by referring to the output result. When step S607 is completed, the network management apparatus 400 performs step S608.

In step S608, the network management apparatus 400 detects that an operation of providing the wireless device 200 serving as a repeater at an actual site is performed (receives an input of completion of the operation), based on a repeater arrangement decision result displayed in step S607. When the wireless device 200 has a restriction in an arrangement location, such as driving by a power source, the operator provides a wireless device serving as a repeater at a possible location closest to the displayed arrangement location of a repeater. Upon determining completion of installation, the network management apparatus 400 returns to step S602 and collects the neighboring terminal management table information. The network management apparatus 400 calculates the repeater arrangement required for all wireless devices 200 to achieve the predetermined communication requirement, by repeating the processes of FIG. 6 until the wireless device 200 decided that a repeater is required to be added does not exist (until NO is decided in step S604).

(1-7-2) Input Screen of Site Configuration Information

A screen display example (the input screen 700) for inputting the site configuration information displayed on the display device 413 of the network management apparatus 400 in response to a user operation will be described with reference to FIGS. 7A and 7B. In FIG. 7A, a display area 701 for displaying a site layout (map information), the wireless device 200, and the like is provided in the input screen 700. An item 702 for changing input content related to the site configuration information is provided in the input screen 700.

By displaying the site layout such as a map or the like as illustrated in FIG. 7A, it is possible to manage the location information of the wireless device 200 and the gateway 300 by inputting the location information via a mouse operation or the like of the operator. At this time, by providing scale information on a screen, it is possible to manage the distance between the wireless devices 200 and the distance between the wireless device 200 and the gateway 300 at the site, based on a distance and the scale information on the screen, even when, for example, detailed latitude information and longitude information of the wireless device 200, the gateway 300, or the like are unable to be identified. As described above, when GPS information or the like is stored and maintained, such information may be automatically input to the screen.

Then, a screen display example related to inputting of the obstacle information present at the site will be described with reference to FIG. 7B. In the item 702, when the input information is changed to the obstacle information, for example, a drawing cursor 703 for inputting the obstacle information is displayed. The operator may draw an obstacle 704 present at the site to input the location information and size information of the obstacle by operating the drawing cursor 703 via a mouse operation. Here, when material information of the obstacle is known, material information of metal, concrete, or the like may be input as in a material information input portion 705. By managing the material information of the obstacle, it is possible to calculate an amount of attenuation of received power caused by the obstacle with satisfactory precision, in processes of FIG. 12 described later. However, it is not essential to input the material information. As described above, when structural information of the site is known and precise location information and size information of the obstacle are able to be identified, such information may be automatically input without depending on an input of the operator. The location information of the wireless device 200 and the gateway 300, and the obstacle information input as above are stored in the storage device 401.

(1-7-3) Collecting Process of Neighboring Terminal Management Table Information

Figure 8:
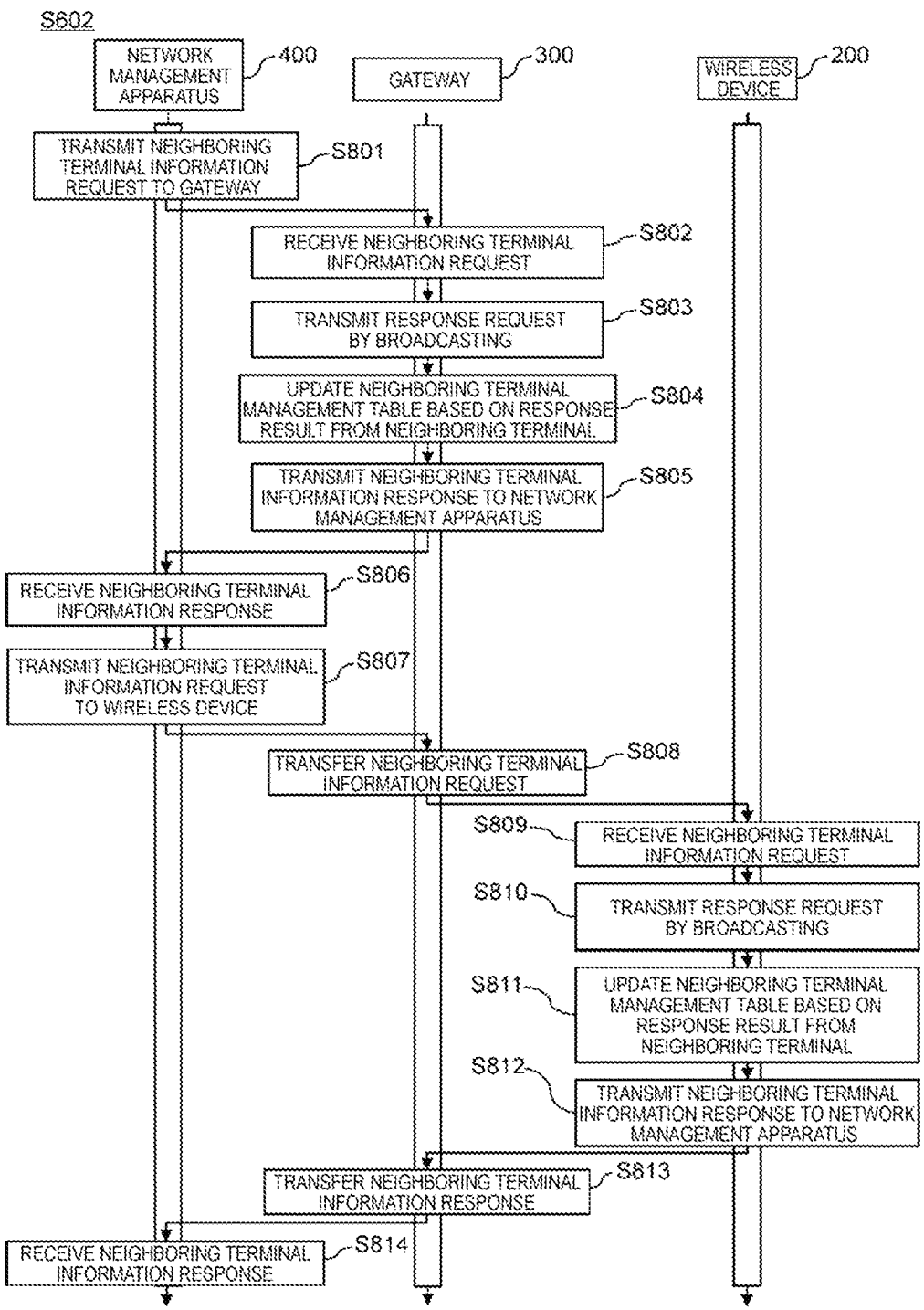
FIG. 8 is a sequence diagram illustrating processes of collecting neighboring terminal management table information.

The collecting process of the neighboring terminal management table information performed in step S602 of FIG. 6 will be described with reference to FIG. 8. FIG. 8 illustrates an example of a sequence diagram related to the collecting process of the neighboring terminal management table information in the communication system. For example, the processes of FIG. 8 may be performed when the network management apparatus 400 collects the neighboring terminal management table information stored and maintained by the gateway 300 and the wireless device 200, as the network configuration information.

In step S801, the network management apparatus 400 transmits a neighboring terminal information request packet to the gateway 300. The neighboring terminal information request packet is a packet requesting a designated terminal to notify neighboring terminal management table information stored and maintained therein.

In step S802, the gateway 300 receives the neighboring terminal information request packet. At this time, the communication processing unit 302 of the gateway 300 identifies whether it is requested to notify the neighboring terminal management table information, by referring to a final destination of the packet. The communication processing unit 302 notifies the neighboring terminal information management unit 304 that the neighboring terminal management table information is requested.

In step S803, the neighboring terminal information management unit 304 of the gateway 300 broadcasts a response request packet upon receiving the notification that the neighboring terminal management table information is requested. The response request packet is a packet requesting a neighboring terminal that received the response request packet to transmit a response packet.

In step S804, the gateway 300 receives a response packet from a reception terminal of the response request packet, that is, a partner terminal capable of direct communication in one hop, analyzes the packet in the communication processing unit 302, and notifies the neighboring terminal information management unit 304 that a response is received. Then, upon identifying the reception of the response packet, the neighboring terminal information management unit 304 updates the neighboring terminal management table 305 and records a transmission source of the response packet in the measurement destination 502, a received time of the response packet in the recorded time 503, and communication quality information, such as RSSI during reception of the response packet, in the communication quality 504. Processes related to transmitting and receiving of the response request packet and the response packet may be performed a plurality of times. The number of times may be arbitrarily set, and when the number of times is increased, it is possible to detect a neighboring terminal with high precision.

In step S805, the gateway 300 transmits a neighboring terminal information response packet storing the updated neighboring terminal management table information to the network management apparatus 400.

In step S806, the network management apparatus 400 receives the neighboring terminal information response packet from the gateway 300. Here, the network configuration management unit 406 records the neighboring terminal management table information of the gateway 300 in the storage device 401, as the network configuration information.

In step S807, the network management apparatus 400 transmits a neighboring terminal information request packet to the wireless device 200 under the gateway 300. When the path management units 203 and 303 are storing and maintaining the communication path information according to autonomous communication path control of the wireless device 200 and the gateway 300, the final destination may be designated as the neighboring terminal information request packet, but when the wireless device 200 and the gateway 300 are not storing and maintaining the communication path information, such as when the path management unit 403 of the network management apparatus 400 is centrally controlling a communication path, information of a repeater path is also stored in the neighboring terminal information request packet so as to perform transmission via source routing based on the stored information of the repeater path.

In step S808, the gateway 300 receives the neighboring terminal information request packet. Here, the communication processing unit 302 of the gateway 300 transmits the packet to an appropriate transfer destination, by referring to the final destination of the packet. When the path management unit 303 is storing and maintaining the path information up to the predetermined wireless device 200, the gateway 300 performs the transfer according to the information. Meanwhile, when the path information is not stored and maintained, the gateway 300 performs the transfer according to information designated via source routing.

In step S809, the wireless device 200 designated by the network management apparatus 400 in step S807 receives the neighboring terminal information request packet, and the communication processing unit 202 of the wireless device 200 identifies that the notification of the neighboring terminal management table information is requested to itself by referring to the final destination of the packet. At this time, the communication processing unit 202 of the wireless device 200 notifies the neighboring terminal information management unit 204 that the neighboring terminal management table information is requested.

In step S810, the neighboring terminal information management unit 204 broadcasts a response request packet upon receiving the notification that the neighboring terminal management table information is requested.

In step S811, the wireless device 200 receives a response packet from a reception terminal of the response request packet, analyzes the response packet in the communication processing unit 202, and notifies the neighboring terminal information management unit 204 that a response is received. Then, upon identifying the reception of the response packet, the neighboring terminal information management unit 204 updates the neighboring terminal management table 205 as in step S804.

In step S812, the wireless device 200 transmits a neighboring terminal information response packet storing the updated neighboring terminal management table information to the network management apparatus 400. When the neighboring terminal information request packet is transmitted via source routing in step S807, it is possible to transmit the neighboring terminal information response packet to the network management apparatus 400 via source routing by storing, as information of a repeater path, a reverse order of the repeater path stored in the response packet, in the neighboring terminal information response packet.

In step S813, the gateway 300 receives the neighboring terminal information response packet, and the communication processing unit 302 of the gateway 300 transfers the neighboring terminal information response packet to the network management apparatus 400 by referring to the final destination of the packet.

In step S814, the network management apparatus 400 receives the neighboring terminal information response packet by the wireless device 200. Here, the network configuration management unit 406 records the neighboring terminal management table information of the wireless device 200 in the storage device 401, as the network configuration information. Then, by transmitting the neighboring terminal information request packet of step S807 to each wireless device 200 present under the gateway 300 as such, it is possible to collect the neighboring terminal management table information from each wireless device 200 and record the neighboring terminal management table information by the network configuration management unit 406, thereby managing an overall configuration of a network. When a response is not obtained even when a certain period of time is passed after the network management apparatus 400 transmitted the neighboring terminal information request packet, an appropriate retransmission process may be performed. The wireless device 200 from which a response is not obtained even by performing the retransmission process a certain number of times may be assumed to be in an isolated state not participating in the network.

FIG. 8 illustrates an example in which the network management apparatus 400 collects the neighboring terminal management table information via an appropriate command to the gateway 300 and the wireless device 200, but the gateway 300 and the wireless device 200 may autonomously transmit the neighboring terminal management table information to the network management apparatus 400 at regular cycles. For example, in case of a wireless device based on the wireless standard Wireless HART (registered trademark), it is possible to periodically notify information equivalent to the neighboring terminal management table as a Health Report, and the collecting process of the neighboring terminal management table information in step S602 of FIG. 6 may be performed according to the current process.

(1-7-4) Example of Network Configuration

Figure 9:
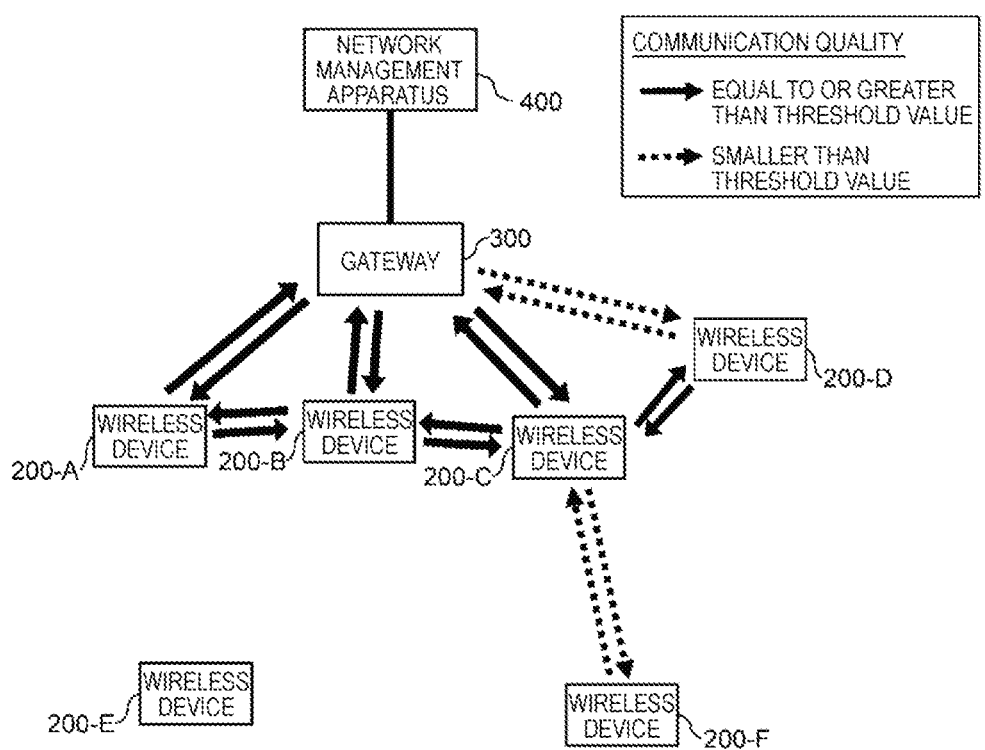
FIG. 9 is a diagram illustrating an example of a network configuration based a result of collecting the neighboring terminal management table information.

A network configuration managed by a result of collecting the neighboring terminal management table information will be described with reference to FIG. 9. FIG. 9 illustrates the network configuration example based on the result of collecting the neighboring terminal management table information in the communication system 1.

For example, when the network management apparatus 400 collected the information (the neighboring terminal management table information) of the neighboring terminal management table 205 illustrated in FIG. 5 from the wireless device 200-1A of FIG. 1 in step S602 of FIG. 6, it may be identified that the wireless device 200-A is capable of direct communication with the gateway 300 and the wireless device 200-B by one hop and at the same time, communicable with communication quality respectively of −65 dBm and −70 dBm. As such, when the neighboring terminal management table information of the gateway 300 and the wireless device 200 is collected and managed by the network configuration management unit 406 of the network management apparatus 400, it is possible to identify connectivity (for example, communication quality being equal to or greater than a threshold value) between all wireless devices 200 illustrated in FIG. 9 and between the gateway 300 and the wireless device 200, as configuration information of a wireless network. In the repeater necessity decision process and the connection destination decision process described later with reference to FIGS. 10 and 11, decision is performed based on the configuration information illustrated in FIG. 9.

In FIG. 9, the communication quality of link is illustrated in solid lines (equal to or greater than the threshold value) or dotted lines (smaller than the threshold value) depending on whether the communication quality is equal to or greater than the threshold value or not. The threshold value of the communication quality is set to a level indicating achievability of a communication requirement requested in the communication system 1. When another indicator, such as a packet loss rate or the like, is emphasized in an application operated in the communication system 1, in addition to a threshold value using RSSI as an indicator, a threshold value incorporating such an indicator may be appropriately set regarding the achievability of the communication requirement.

In addition to statically pre-defining the threshold value in a program, the threshold value may be stored and maintained as a variable parameter and the operator may dynamically define the threshold value appropriately via a screen displaying communication quality information described later, a result of deciding the arrangement location of the repeater, or the like.

(1-7-5) Repeater Necessity Decision Process

Figure 10:
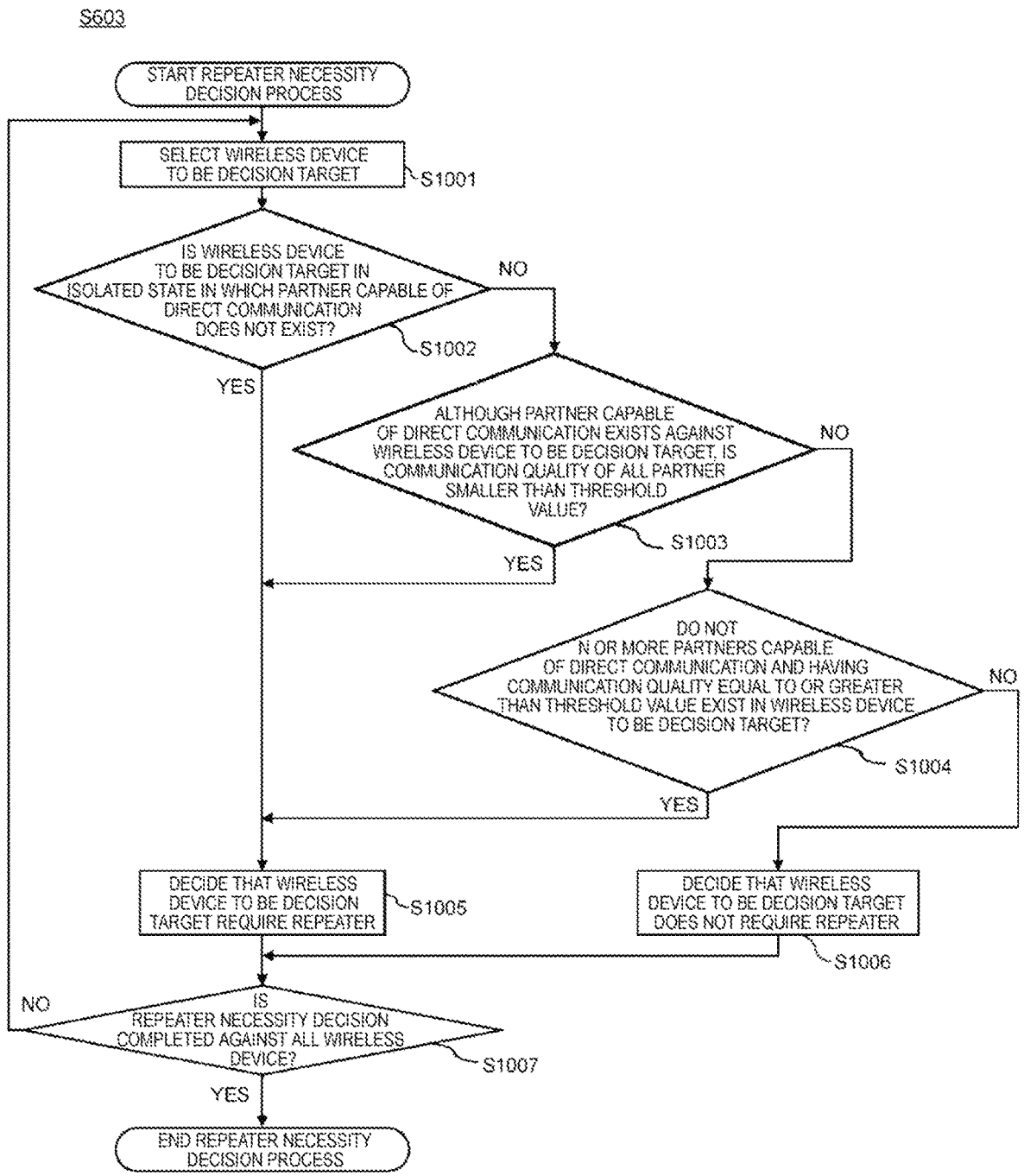
FIG. 10 is a flowchart illustrating a repeater necessity decision process.

The repeater necessity decision process performed by the repeater necessity decision unit 407 of the network management apparatus 400 in step S603 of FIG. 6 will be described with reference to FIG. 10. FIG. 10 illustrates a processing procedure related to the repeater necessity decision process in the communication system 1. The repeater necessity decision unit 407 is able to decide necessity of adding a repeater to each wireless device 200, based on information managed by the network configuration management unit 406, by executing the processes of FIG. 10.

In step S1001, the repeater necessity decision unit 407 selects one wireless device 200 to be a decision target of the necessity of a repeater, among all wireless devices 200. When step S1001 is completed, the repeater necessity decision unit 407 performs step S1002.

In step S1002, the repeater necessity decision unit 407 decides whether the wireless device 200 to be the decision target is in an isolated state in which a partner capable of direct communication by one hop does not exist around. For example, in the example of FIG. 9, the wireless device 200-E is in an isolated state. When it is decided that the wireless device 200 to be the decision target is in the isolated state (when YES), the repeater necessity decision unit 407 performs step S1005, and when it is decided that the wireless device 200 to be the decision target is not in the isolated state (when NO), the repeater necessity decision unit 407 performs step S1003.

In step S1003, the repeater necessity decision unit 407 decides, against the wireless device 200 to be the decision target, despite the presence of the partner capable of direct communication by one hop, whether communication quality with the partner (in detail, communication quality towards itself) is all smaller than the threshold value. For example, in the example of FIG. 9, the wireless device 200-F is capable of direct communication with only the wireless device 200-C, but since the communication quality is smaller than the threshold value, a predetermined communication requirement is unable to be satisfied, and thus the decision condition is met. When it is decided that the communication partner device having communication quality equal to or greater than the threshold value does not exist regarding the wireless device 200 (when YES), the repeater necessity decision unit 407 performs step S1005, and when it is decided that the communication partner device having the communication quality equal to or greater than the threshold value exists (when NO), the repeater necessity decision unit 407 performs step S1004.

In step S1004, the repeater necessity decision unit 407 decides, against the wireless device 200 to be the decision target, whether N or more wireless devices 200 capable of direct communication by one hop and having communication quality equal to or greater than the threshold value are not present. Here, as a characteristic of a wireless multi-hop network, there is a merit that, when local communication interruption occurs, a failure may be recovered by switching to another communication path. In this regard, redundancy capable of path switching only is required for communication connection of each wireless device 200. When N is 1, redundancy presence of communication connection is not considered in deciding the necessity of a repeater, and when N is set to a value equal to or greater than 2, the redundancy presence is incorporated into deciding the necessity of a repeater. When the value of N is increased, a communication system having higher redundancy and excellent fault tolerance may be built, but since the number of required repeaters is increased, the cost is also increased. N is an arbitrary value equal to or greater than 1, and may be appropriately set in consideration of such tradeoff.

For example, in the wireless device 200-D of FIG. 9, only the wireless device 200-C is the communication partner device capable of direct communication and having the communication quality equal to or greater than the threshold value, and when communication connection with the wireless device 200-C is disconnected, a path for obtaining communication quality equal to or greater than the threshold value is unable to be secured. Since only one communication partner device capable of direct communication with communication quality equal to or greater than the threshold value exists against the wireless device 200-E, when N is 2, the condition of step S1004 is met. When it is decided that N or more communication partner devices having the communication quality equal to or greater than the threshold value are not present in the wireless device 200 to be the decision target (when YES), the repeater necessity decision unit 407 performs step S1005, and when it is decided that N or more communication partner devices are present (when NO), the repeater necessity decision unit 407 performs step S1006.

In step S1005, the repeater necessity decision unit 407 decides the wireless device 200 that meets the decision condition of any one of steps S1002 to S1004 to be the wireless device 200 that requires addition of a repeater. In other words, (1) the wireless device 200 in the isolated state in which the partner terminal capable of direct communication by one hop does not exist, (2) the wireless device 200 that does not have the partner terminal capable of direct communication by one hop and having the communication quality equal to or greater than the threshold value, and (3) the wireless device 200 that has the partner terminal capable of direct communication by one hop and having the communication quality equal to or greater than the threshold value exists, in which the number of partner terminals is smaller than N, are decided as the wireless devices 200 that require addition of a repeater. When step S1005 is completed, the repeater necessity decision unit 407 performs step S1007.

In step S1006, the repeater necessity decision unit 407 decides the wireless device 200 that does not meet any of the decision conditions of steps S1002 to S1004 to be the wireless device 200 that does not require addition of a repeater. When step S1006 is completed, the repeater necessity decision unit 407 performs step S1007.

In step S1007, the repeater necessity decision unit 407 decides whether the decision of necessity of a repeater is completed against all wireless devices 200. When it is decided that the decision of necessity of a repeater is completed for all wireless devices 200 (when YES), the repeater necessity decision process is ended, and when it is decided that the wireless device 200 not decided is left (when NO), step S1001 is performed to select the wireless device 200 not decided as the decision target and the decision of necessity of a repeater is repeated.

(1-7-6) Connection Destination Decision Process

Figure 11:
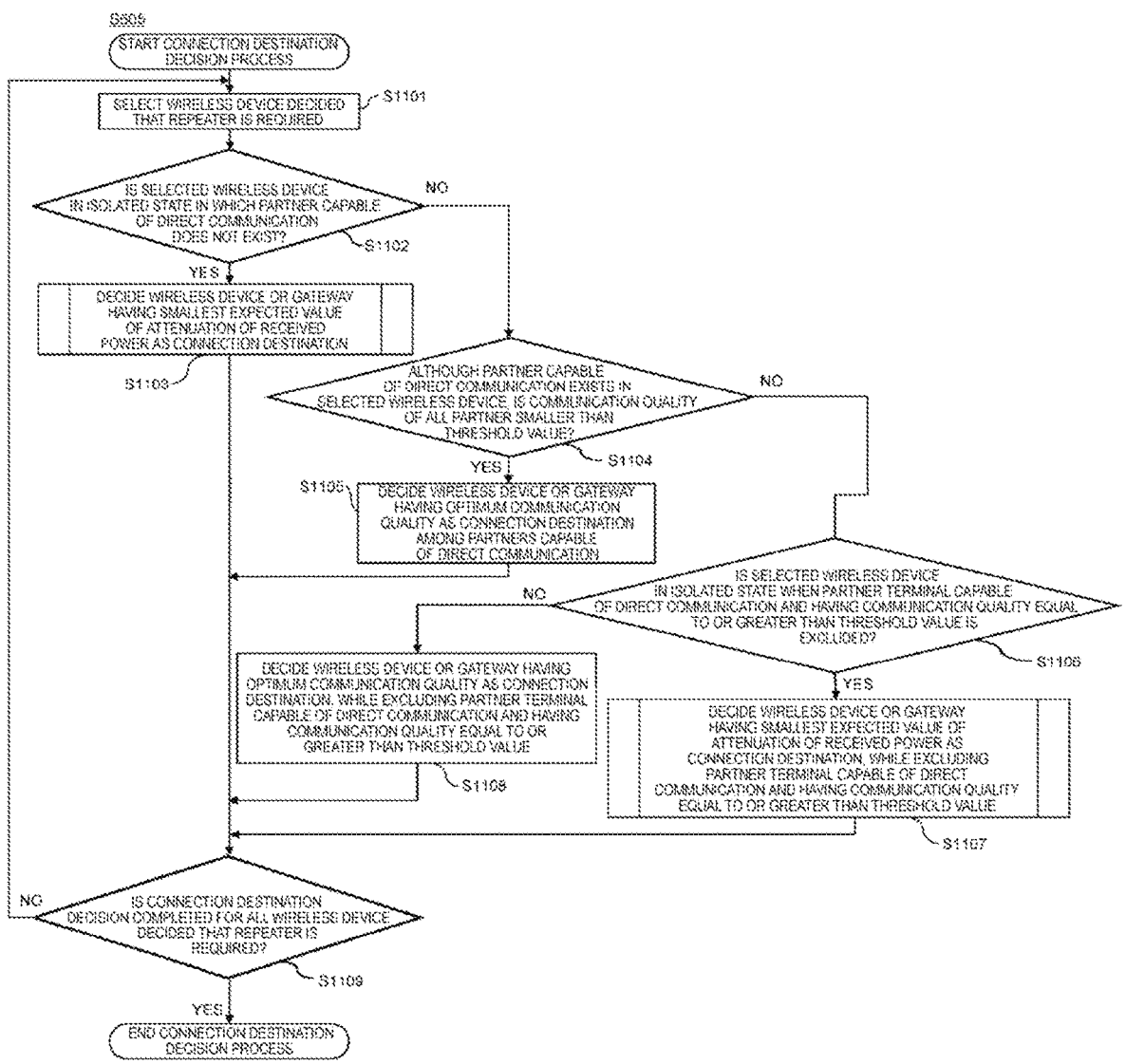
FIG. 11 is a flowchart illustrating a connection destination decision process.

The connection destination decision process performed by the connection destination decision unit 408 of the network management apparatus 400 in step S605 of FIG. 6 will be described with reference to FIG. 11. FIG. 11 illustrates a processing procedure related to the connection destination decision process in the communication system 1. By performing the processes of FIG. 11, the connection destination decision unit 408 is able to decide (determine) to which wireless device 200 or gateway 300 the wireless device 200 decided that addition of a repeater is required via the repeater necessity decision process of FIG. 10 is to be connected, based on the management information or the like of the network configuration management unit 406.

In step S1101, the connection destination decision unit 408 selects one wireless device 200 to be a target of the connection destination decision process among the wireless devices 200 decided that a repeater is required to be added via the repeater necessity decision process of FIG. 10. When step S1101 is completed, the connection destination decision unit 408 performs step S1102.

In step S1102, the connection destination decision unit 408 decides whether the wireless device 200 to be the decision target is in an isolated state in which a partner capable of direct communication by one hop does not exist. When it is decided that the wireless device 200 to be the decision target is in the isolated state (when YES), the connection destination decision unit 408 performs step S1103, and when it is decided that the wireless device 200 to be the decision target is not in the isolated state (when NO), the connection destination decision unit 408 performs step S1104.

In step S1103, the connection destination decision unit 408 decides the wireless device 200 or the gateway 300 having a smallest expected value related to attenuation of received power as an appropriate connection destination, against the wireless device 200 in the isolated state. Here, a communication success rate is improved when an expected value of an amount of attenuation regarding transmitted radio waves is small and received power is large. Accordingly, herein, a partner terminal having a small expected value of received power attenuation is decided as the connection destination. Such a decision process will be described later with reference to FIG. 12. When step S1103 is completed, the connection destination decision unit 408 performs step S1109.

In step S1104, the connection destination decision unit 408 decides, against the wireless device 200 to be the decision target, despite the presence of the partner capable of direct communication by one hop, whether communication quality with the partner is all smaller than a threshold value. When it is decided that only a communication partner device having communication quality smaller than the threshold value exists regarding the wireless device 200 to be the decision target (when YES), the connection destination decision unit 408 performs step S1105, and when it is decided that a communication partner device having communication quality equal to or greater than the threshold value exists (when NO), the connection destination decision unit 408 performs step S1106.

In step S1105, the connection destination decision unit 408 decides the wireless device 200 or the gateway 300 having optimum communication quality as an appropriate connection destination, among partner terminals capable of direct communication, against the wireless device 200 in which a partner terminal having communication quality equal to or greater than the threshold value does not exist. This is because it is highly likely that communication quality may be improved and stabilized by adding a repeater when communication connection is obtainable even by the communication partner device having communication quality smaller than the threshold value regardless of an obstacle. For example, in the example of FIG. 9, although the wireless device 200-F has communication quality smaller than the threshold value, since communication connection with the wireless device 200-C is obtained, the wireless device 200-C is selected as an appropriate connection destination. When step S1105 is completed, the connection destination decision unit 408 performs step S1109.

In step S1106, the connection destination decision unit 408 decides whether the wireless device 200 to be the decision target is in an isolated state, when a partner terminal capable of direct communication and having communication quality equal to or greater than the threshold value is excluded from the wireless device 200 to be the decision target. When it is decided that the wireless device 200 to be the decision target is in the isolated state (when YES) via the exclusion, the connection destination decision unit 408 performs step S1107, and when it is decided that the wireless device 200 to be the decision target is not in the isolated state (when NO), the connection destination decision unit 408 performs step S1108. For example, when N is 2, in the example of FIG. 9, the wireless device 200-D is decided that a repeater is required to be added via the repeater necessity decision process of FIG. 10, and the decided in step S1106. In this example, when the wireless device 200-C having communication quality equal to or greater than the threshold value is excluded from the wireless device 200-D, the gateway 300 having communication quality smaller than the threshold value is left as a communication partner device, and thus the wireless device 200-D is decided to be not in an isolated state via the decision of step S1106.

In step S1107, after a partner terminal capable of direct communication and having communication quality equal to or greater than the threshold value is excluded, the connection destination decision unit 408 decides the wireless device 200 or the gateway 300 having a smallest expected value of an amount of attenuation regarding received power as an appropriate connection destination, against the wireless device 200 to be the decision target. This is to select the wireless device 200 or the gateway 300 expected to have a satisfactory communication success rate as a connection destination, because largest received power may be obtained as described above regarding securing redundancy of communication connection. Details about such a decision process will be described later with reference to FIG. 12. When step S1107 is completed, the connection destination decision unit 408 performs step S1109.

In step S1108, The connection destination decision unit 408 decides the wireless device 200 or the gateway 300 having optimum communication quality as an appropriate connection destination among partner terminals capable of direct communication, after excluding a partner terminal capable of direct communication and having communication quality equal to or greater than the threshold value, against the wireless device 200 to be the decision target. This is to select the wireless device 200 or the gateway 300, in which communication quality is most likely to be improved and stabilized by adding a repeater, as a connection destination as described above, regarding securing redundancy of communication connection. In the example of FIG. 9, according to the decision process, the gateway 300 is selected as a connection destination of the wireless device 200-D. When step S1108 is completed, the connection destination decision unit 408 performs step S1109.

In step S1109, the connection destination decision unit 408 decides whether the connection destination decision is completed against all wireless devices 200 decided that a repeater is required to be added. When it is decided that the decision is completed for all wireless devices 200 (when YES), the connection destination decision unit 408 ends the connection destination decision process, and when it is decided that the wireless device 200 not decided is left (when NO), the connection destination decision unit 408 performs step S1101 to select the wireless device 200 not decided as a decision target and repeats the connection destination decision.

Figure 12:
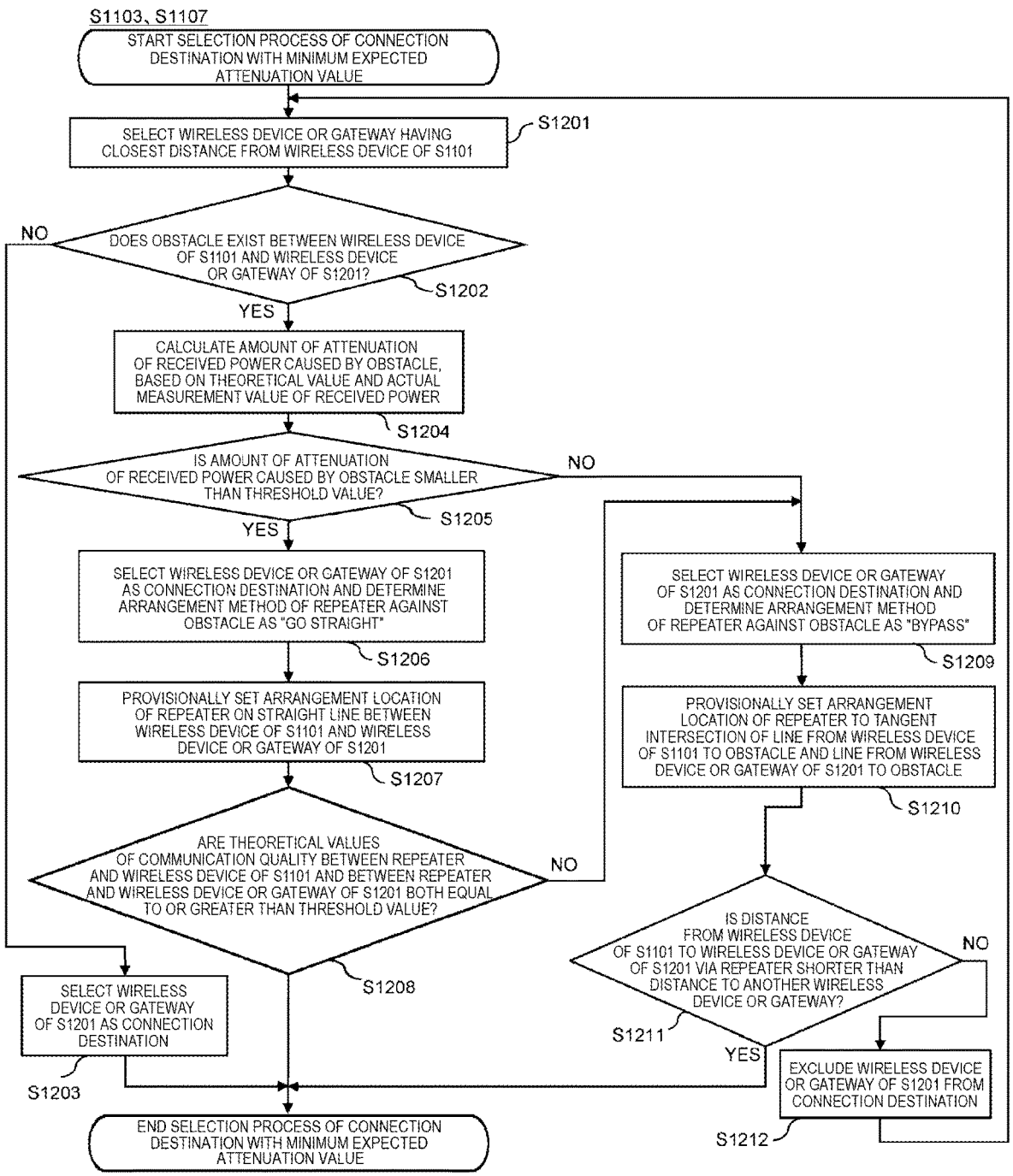
FIG. 12 is a flowchart illustrating a minimum attenuation expected value connection destination selection process.

(1-7-7) Minimum Attenuation Expected Value Connection Destination Selection Process A decision process for selecting a connection destination having a smallest expected value of attenuation of received power (minimum attenuation expected value connection destination selection process) of steps S1103 and S1107 of FIG. 11 will be described with reference to FIG. 12. FIG. 12 illustrates a processing procedure related to the minimum attenuation expected value connection destination selection process in steps S1103 and S1107 of FIG. 11 in the communication system 1. By performing FIG. 12, it is possible for the connection destination decision unit 408 to select a connection destination having a smallest expected value of attenuation of received power, in consideration of an effect of an obstacle present at the site.

In step S1201, the connection destination decision unit 408 selects the wireless device 200 or the gateway 300 having a closest distance from the wireless device 200 selected in step S1101 of FIG. 11, as a connection destination candidate. This is because an expected value of attenuation is decreased in the wireless device 200 or the gateway 300 present in the closest distance when there is no obstacle, based on the tendency of radio waves being attenuated with a distance. When step S1201 is completed, the connection destination decision unit 408 performs step S1202.

In step S1202, the connection destination decision unit 408 decides whether an obstacle exists between the wireless device 200 selected in step S1101 of FIG. 11 and the wireless device 200 or the gateway 300 selected in step S1201, based on the site configuration information managed by the site configuration information management unit 405 of the network management apparatus 400. When it is decided that an obstacle exists (when YES), the connection destination decision unit 408 performs step S1204, and when it is decided that an obstacle does not exist (when NO), the connection destination decision unit 408 performs step S1203. For example, in the example of FIG. 7B, when the wireless device 200 selected in step S1101 is "E" (the wireless device 200-E), since "A" (the wireless device 200-A) exists in a closest distance and the obstacle 704 exists on a transfer path (a straight line between "A" and "E"), step S1204 is performed.

In step S1203, the connection destination decision unit 408 selects the wireless device 200 or the gateway 300 selected in step S1201 as a connection destination of the wireless device 200 selected in step S1101 of FIG. 11. This is because the expected value of attenuation is minimized in the wireless device 200 or the gateway 300 in the closest distance when the obstacle does not exist on the transfer path as described above. When step S1203 is completed, the connection destination decision unit 408 ends the minimum attenuation expected value connection destination selection process.

In step S1204, the connection destination decision unit 408 calculates an amount of attenuation of received power caused by the obstacle present between the wireless device 200 selected in step S1101 of FIG. 11 and the wireless device 200 or the gateway 300 selected in step S1201. In particular, the connection destination decision unit 408 first calculates a theoretical value of the received power from a distance between two terminals. For example, by applying a Friis transmission equation, a theoretical value of an amount of attenuation regarding a distance when an obstacle does not exist may be calculated, and thus the theoretical value of received power may be obtained by applying the theoretical value of the amount of attenuation regarding a transmission output of the wireless device 200 or the gateway 300. Then, the connection destination decision unit 408 calculates the amount of attenuation caused by the obstacle by obtaining a difference between the theoretical value and an actual measurement value of the received power based on information of the neighboring terminal measurement tables 205 and 305 collected respectively from the wireless device 200 and the gateway 300. For example, it is assumed that a theoretical value of received power is "−70 dBm". At this time, it is assumed that received power is not measured, that is, an actual measurement value on a neighboring terminal management table is below lowest receive sensibility of the wireless device 200 or the gateway 300. For example, it may be said that attenuation equal to or greater than 20 dBm is generated due to an obstacle when the lowest receive sensibility is "−90 dBm". As such, in step S1204, the connection destination decision unit 408 calculates the amount of attenuation of the received power caused by the obstacle, based on the theoretical value and the actual measurement value of the received power. When material information of the obstacle is known as in FIG. 7B, the amount of attenuation caused by the obstacle may be estimated based on the material information. When step S1204 is completed, the connection destination decision unit 408 performs step S1205.

In step S1205, the connection destination decision unit 408 decides whether the amount of attenuation caused by the obstacle is smaller than a threshold value. Here, the threshold value may be set to a suitable arbitrary value. When it is determined that the amount of attenuation caused by the obstacle is smaller than the threshold value (when YES), the connection destination decision unit 408 performs step S1206, and when it is determined that the amount of attenuation is equal to or greater than the threshold value (when NO), the connection destination decision unit 408 performs step S1209.

In step S1206, the connection destination decision unit 408 selects the wireless device 200 or the gateway 300 selected in step S1201 as the connection destination of the wireless device 200 selected in step S1101 of FIG. 11, and further, as an arrangement method of a repeater, determines to pass (transmit radio waves) against the obstacle. This is because, when it is determined that the amount of attenuation caused by the obstacle is smaller than the threshold value in the decision of step S1205, it is expected that uniform received power may be maintained even when communication is performed by transmitting radio waves through the obstacle. When step S1206 is completed, the connection destination decision unit 408 performs step S1207.

In step S1207, in order to pass radio waves against the obstacle, the connection destination decision unit 408 provisionally sets an arrangement location of a repeater to be on a straight line between the wireless device 200 selected in step S1101 of FIG. 11 and the wireless device 200 or the gateway 300 selected in step S1201. An example of such setting will be described later with reference to FIG. 14. When step S1207 is completed, the connection destination decision unit 408 performs step S1208.

In step S1208, the connection destination decision unit 408 decides whether, via the repeater arrangement provisionally set in step S1207, a theoretical value of communication quality between the repeater and the wireless device 200 selected in step S1101 of FIG. 11 and a theoretical value of communication quality between the repeater and the wireless device 200 or the gateway 300 selected in step S1201 are all equal to or greater than the threshold value. In particular, the connection destination decision unit 408 calculates a theoretical value of an amount of attenuation when an obstacle does not exist by applying, for example, a Friis transmission equation regarding a distance to the repeater, and further adds the amount of attenuation caused by the obstacle calculated in step S1204 to the amount of attenuation when an obstacle exists therebetween. Then, the connection destination decision unit 408 may obtain a theoretical value of received power by applying the amount of attenuation on a transmission output of the wireless device 200 or the gateway 300. When it is decided that the theoretical received powers are all equal to or greater than the threshold value (communication quality such as a communication success rate derived from the received power may alternatively be equal to or greater than the threshold value) (when YES), it is expected that predetermined communication quality may be satisfied even when radio waves are passed through the obstacle, and thus the connection destination decision unit 408 may end the minimum attenuation expected value connection destination selection process. Meanwhile, when it is decided that at least one thereof is smaller than the threshold value (when NO), the predetermined communication quality is unable to be satisfied, and thus the connection destination decision unit 408 does not pass radio waves through the obstacle, but determines that bypassing is appropriate and performs step S1209.

In step S1209, the connection destination decision unit 408 selects the wireless device 200 or the gateway 300 selected in step S1201 as the connection destination of the wireless device 200 selected in step S1101 of FIG. 11, and further, as an arrangement method of a repeater, determines to bypass radio waves against the obstacle. This is because, when the amount of attenuation caused by the obstacle is equal to or greater than the threshold value, it is expected that the amount of attenuation is very large even when radio waves are passed through the obstacle and uniform received power is unable to be maintained. When step S1209 is completed, the connection destination decision unit 408 performs step S1210.

In step S1210, in order to bypass radio waves against the obstacle in a prospect environment, the connection destination decision unit 408 provisionally set the arrangement location of the repeater to a tangent intersection of line from the wireless device 200 selected in step S1101 of FIG. 11 to the obstacle and a line from the wireless device 200 or the gateway 300 selected in step S1201 to the obstacle. An example of such setting will be described later with reference to FIG. 14. When step S1210 is completed, the connection destination decision unit 408 performs step S1211.

In step S1211, the connection destination decision unit 408 decides, regarding the repeater arrangement provisionally set in step S1210, whether a distance from the wireless device 200 selected in step S1101 of FIG. 11 to the wireless device 200 or the gateway 300 selected in step S1201 via the repeater is shorter than a distance to another wireless device 200 or gateway 300. Such decision is performed because, among cases in which a propagation distance of radio waves is increased via bypassing and in which the propagation distance is decreased by selecting the other wireless device 200 or gateway 300 as the connection destination, it is expected that the latter case has a lower expected value of attenuation of received power. When it is decided that the distance to the wireless device 200 or the gateway 300 selected in step S1201 is minimum even by setting the repeater arrangement in which the repeater bypasses the radio waves against the obstacle (when YES), the connection destination decision unit 408 ends the minimum attenuation expected value connection destination selection process, and when it is decided that the distance to the other wireless device 200 or gateway 300 is shorter (when NO), the connection destination decision unit 408 performs step S1212.

In step S1212, the connection destination decision unit 408 excludes the wireless device 200 or the gateway 300 selected in step S1201 from the connection destination. The connection destination decision unit 408 excludes the wireless device 200 or the gateway 300 from the connection destination and performs step S1201 again to re-decide the connection destination because the wireless device 200 or the gateway 300 is inappropriate as the connection destination in any case of passing and bypassing due to an effect of the obstacle.

By performing FIG. 12, it is possible to select the connection destination of the wireless device 200 decided that a repeater is required to be added via the repeater necessity decision process of FIG. 10, in consideration of a radio wave propagation characteristic at the site.

(1-7-8) Repeater Arrangement Decision Process

Figure 13:
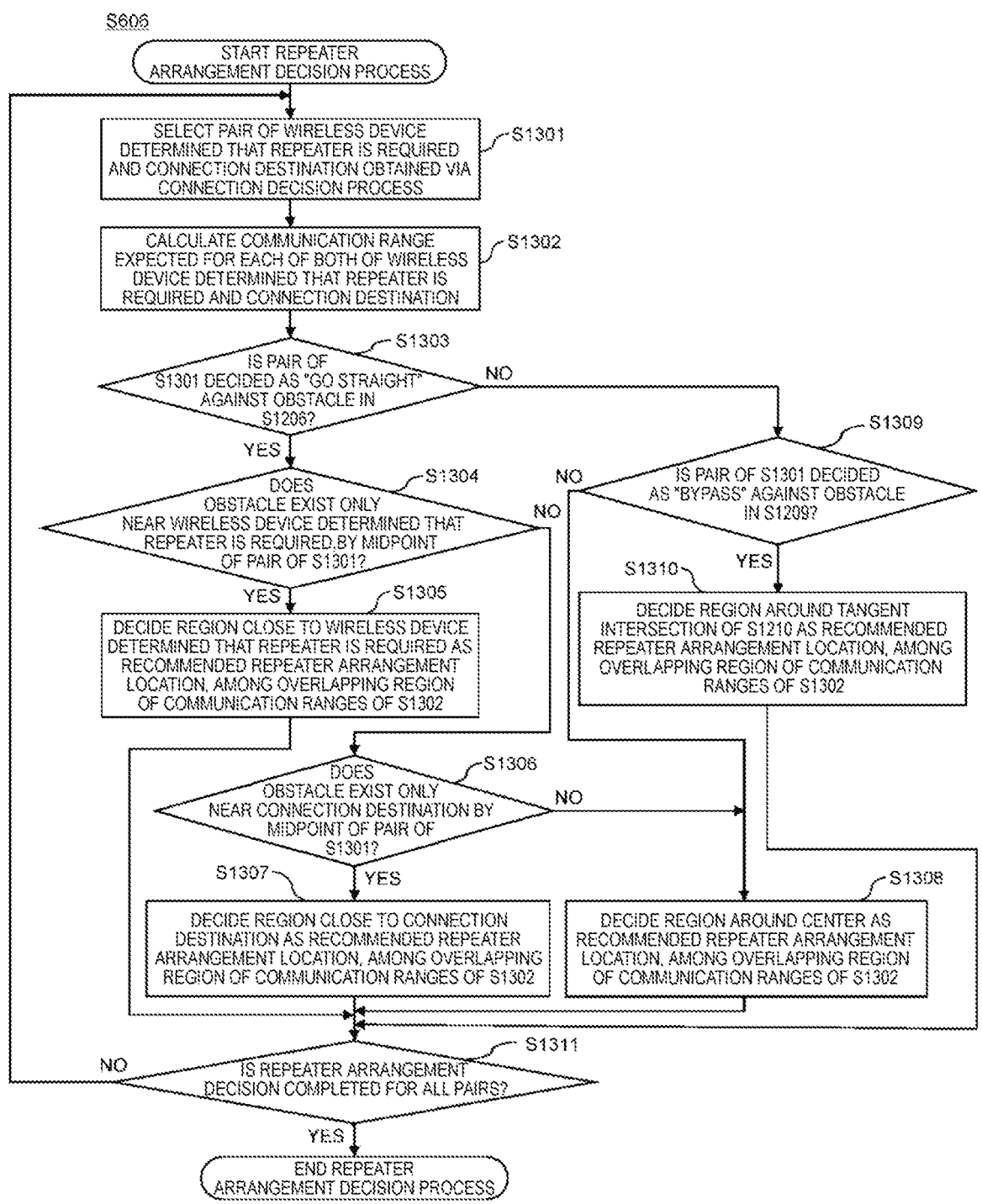
FIG. 13 is a flowchart illustrating a repeater arrangement decision process.

The repeater arrangement decision process performed by the repeater arrangement decision unit 409 of the network management apparatus 400 in step S606 of FIG. 6 will be described with reference to FIG. 13. FIG. 13 illustrates a processing procedure related to the repeater arrangement decision process in the communication system 1. By performing FIG. 13, the repeater arrangement decision unit 409 is able to decide the arrangement location of the repeater required to connect the wireless device 200 decided that a repeater is required to be added via the repeater necessity decision process of FIG. 10 and the connection destination selected via the connection destination decision process of FIG. 11.

In step S1301, the repeater arrangement decision unit 409 selects one pair to be a decision target among pairs of the wireless device 200 decided that a repeater is required to be added via the repeater necessity decision process of FIG. 10 and the connection destination selected via the connection destination decision process of FIG. 11. When step S1301 is completed, the repeater arrangement decision unit 409 performs step S1302.

In step S1302, the repeater arrangement decision unit 409 calculates a communication range expected for each of both of the wireless device 200 decided that a repeater is required to be added and the selected connection destination, against the pair to be the decision target. Regarding the communication range used in the process, a communication range in which communication quality equal to or greater than a threshold value is theoretically obtainable is used, based on, for example, a theoretical equation regarding radio wave propagation, such as Friis transmission equation, or the like. Alternatively, among a distance between the wireless devices 200 in which communication quality equal to or greater than the threshold value is obtained and a distance between the gateway 300 and the wireless device 200, the longest distance may be applied as the communication range, based on the network configuration information illustrated in FIG. 9. As such, the setting of the communication range applied in the decision process is not limited to a specific setting method, and may be set via an arbitrary method. When step S1302 is completed, the repeater arrangement decision unit 409 performs step S1303.

In step S1303, the repeater arrangement decision unit 409 decides whether the arrangement method of a repeater is decided to "go straight" against the obstacle in FIG. 12, against the pair to be the decision target. When it is decided that "go straight" is determined (when YES), the repeater arrangement decision unit 409 performs step S1304, and when it is decided that "go straight" is not determined (when NO), the repeater arrangement decision unit 409 performs S1309.

In step S1304, the repeater arrangement decision unit 409 decides whether the obstacle present on the transfer path exists only at the side (near) of the wireless device 200 decided that a repeater is required to be added, regarding a midpoint of the pair to be the decision target. When it is decided that the obstacle exists only near the wireless device 200 decided that a repeater is required (when YES), the repeater arrangement decision unit 409 performs step S1305, and when not (when NO), the repeater arrangement decision unit 409 performs step S1306.

In step S1305, the repeater arrangement decision unit 409 decides, as a recommended arrangement location of a repeater, a region close to the wireless device 200 decided that a repeater is required to be added, among an overlapping region of the communication ranges calculated in step S1302.

Figure 14A:
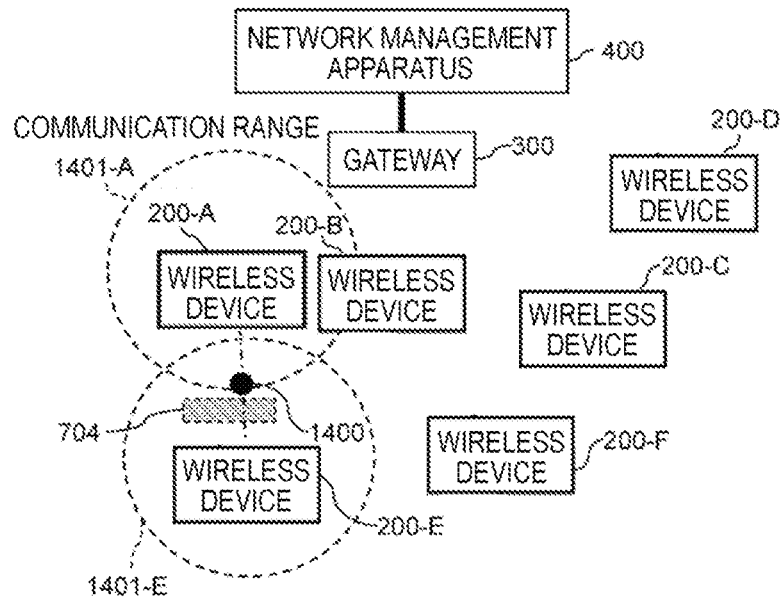
FIGS. 14A and 14B are diagrams illustrating arrangement examples of the repeater according to the repeater arrangement decision process.

Here, an example in which a repeater is arranged to pass against the obstacle for a pair of the wireless device 200-E and the wireless device 200-A in step S1305 is described with reference to FIG. 14A. In FIG. 14A, a dashed line on a concentric circle with the wireless device 200 as a center indicates a communication range of each wireless device 200, and for example, a communication range 1401-A indicates a communication range of the wireless device 200-A. In the example of FIG. 14A, the obstacle 704 exists near the wireless device 200-E regarding the midpoint between the wireless device 200-E and the wireless device 200-A. In this case, among an overlapping region of communication ranges of the wireless device 200-E and the wireless device 200-A, a region closer to the wireless device 200-E is selected as illustrated in a repeater arrangement location 1400. This is because, when the repeater is arranged on the midpoint, the expected value of attenuation of received power in a section between the wireless device 200-E and the repeater is higher compared to a section between the wireless device 200-A and the repeater, due to an influence of the obstacle. By selecting the region close to the wireless device 200-E among the overlapping region of the communication ranges, it is possible to improve the received power between the wireless device 200-E and the repeater. When the arrangement location of a repeater is provisionally set in step S1207 of FIG. 12, the setting is performed according to such a rule. When step S1305 is completed, the repeater arrangement decision unit 409 performs step S1311.

In step S1306, the repeater arrangement decision unit 409 decides whether the obstacle present on the transfer path exists only near the selected connection destination, regarding the midpoint of the pair to be the decision target. When it is decided that the obstacle exists only near the connection destination (when YES), the repeater arrangement decision unit 409 performs step S1307, and when not (when NO), the repeater arrangement decision unit 409 performs step S1308.

In step S1307, the repeater arrangement decision unit 409 decides a region close to the wireless device 200 decided as the connection destination, as the recommended arrangement location of a repeater, among the overlapping region of the communication ranges calculated in step S1302. This process is to improve the received power in a section where the obstacle exists, compared to a case in which a repeater is provided at the midpoint, as described above. When step S1307 is completed, the repeater arrangement decision unit 409 performs step S1311.

In step S1308, the repeater arrangement decision unit 409 decides a region of a center or vicinity of the center (within the overlapping region and within a certain distance from the center) as the recommended location of a repeater, among the overlapping region of the communication ranges calculated in step S1302. Here, the repeater arrangement decision unit 409 selects the center or the vicinity of center of the overlapping region of the communication ranges as the recommended arrangement location of a repeater because a case in which the obstacle exists near both sides regarding the midpoint of the pair to be the decision target, a case in which the obstacle does not exist, or the like is assumed. When step S1308 is completed, the repeater arrangement decision unit 409 performs step S1311.

In step S1309, the repeater arrangement decision unit 409 decides whether the arrangement method of a repeater is decided to "bypass" against the obstacle in step S1209 of FIG. 12, against the pair to be the decision target. When it is decided that "bypass" is determined (when YES), the repeater arrangement decision unit 409 performs step S1310, and when not (when NO), the repeater arrangement decision unit 409 performs step S1308.

In step S1310, the repeater arrangement decision unit 409 decides, as the recommended arrangement location of a repeater, a region around an intersection (within the overlapping region and within a predetermined distance from the intersection) of a line from the wireless device 200 decided that a repeater is required to be added to the obstacle and a line from the connection destination to the obstacle, among the overlapping region of the communication ranges calculated in step S1302.

Figure 14B:
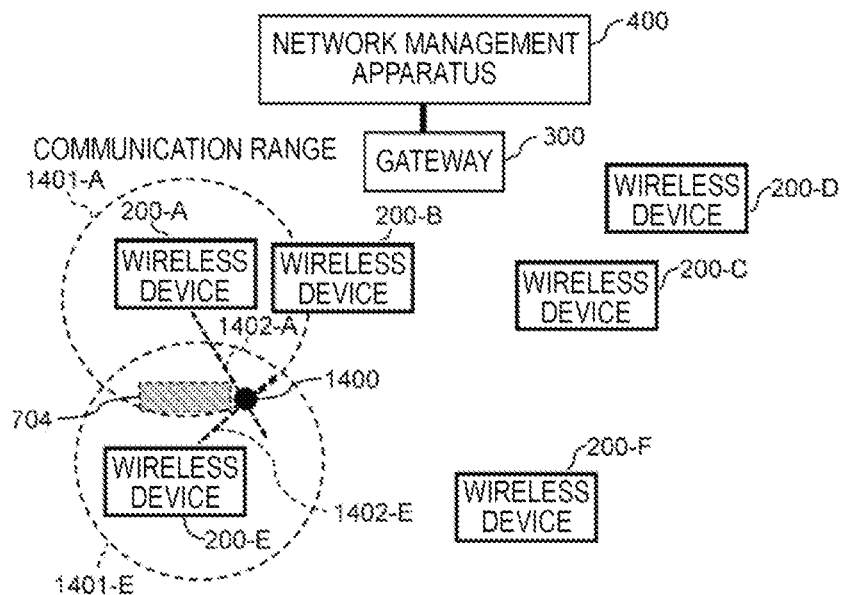

Here, an example in which a repeater is arranged to bypass against the obstacle for the pair of wireless device 200-E and wireless device 200-A in step S1310 will be described with reference to FIG. 14B. In FIG. 14B, a tangent line 1402-A indicates the tangent line drawn against the obstacle from the wireless device 200-A, and a tangent line 1402-E indicates the tangent line drawn against the obstacle from the wireless device 200-E. In the example of FIG. 14B, an intersection of the tangent line 1402-A and the tangent line 140-2E is selected as the repeater arrangement location 1400, among the overlapping region of the communication ranges of the wireless device 200-A and the wireless device 200-E. Accordingly, bypassing of radio waves may be realized in a prospect environment against the obstacle. When the arrangement location of a repeater is provisionally set in step S1210 of FIG. 12, the setting is performed according to the rule. However, at this time for example, when a radio wave propagation distance of "from the wireless device 200-E via the repeater arrangement location 1400 to the wireless device 200-A" is longer than a radio wave propagation distance of "from the wireless device 200-E to the wireless device 200-B", the wireless device 200-A is excluded from a connection destination of the wireless device 200-E via the processes of steps S1211 and S1212 of FIG. 12. When step S1310 is completed, the repeater arrangement decision unit 409 performs step S1311.

In step S1311, the repeater arrangement decision unit 409 decides whether repeater arrangement decision is completed against all pairs of the wireless device 200 decided that a repeater is required to be added via the repeater necessity decision process of FIG. 10 and the connection destination selected via the connection destination decision process of FIG. 11. When it is decided that decision is completed for all pairs (when YES), the repeater arrangement decision unit 409 ends the repeater arrangement decision process, and when it is decided that a pair not decided is left (when NO), the repeater arrangement decision unit 409 performs step S1301 to select the pair not decided as a decision target and repeat the repeater arrangement decision.

In FIG. 13, when the overlapping region of the communication range does not exist against the pair, the overlapping region of the communication ranges is generated by assuming that the pair is connected by using a plurality of repeaters, instead of connecting the pair with one repeater.

(1-7-9) Output Screen

Figure 15A:
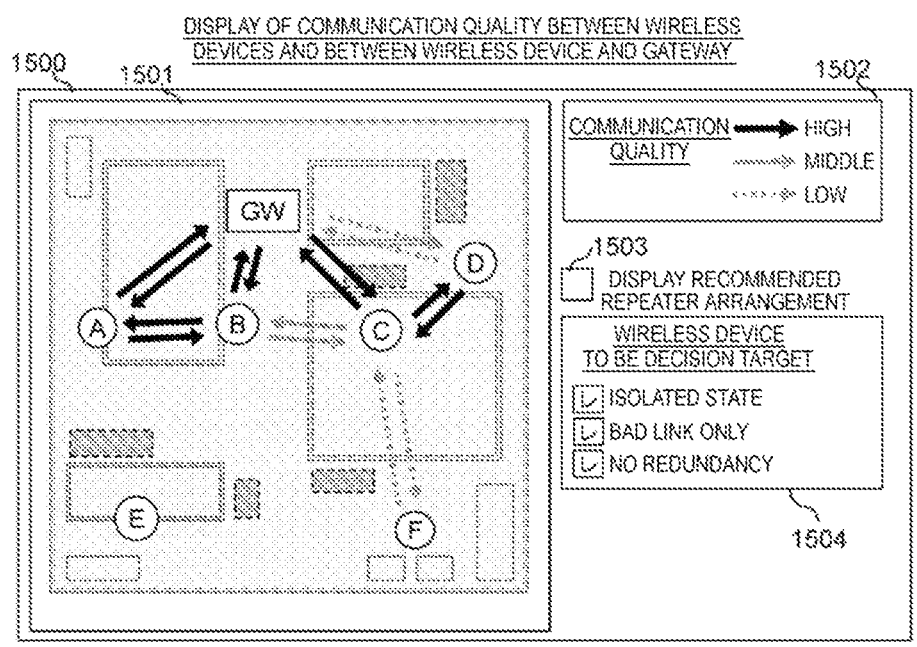
FIGS. 15A and 15B are diagrams illustrating output screens for outputting results of determining communication quality information and a repeater arrangement.
Figure 15B:
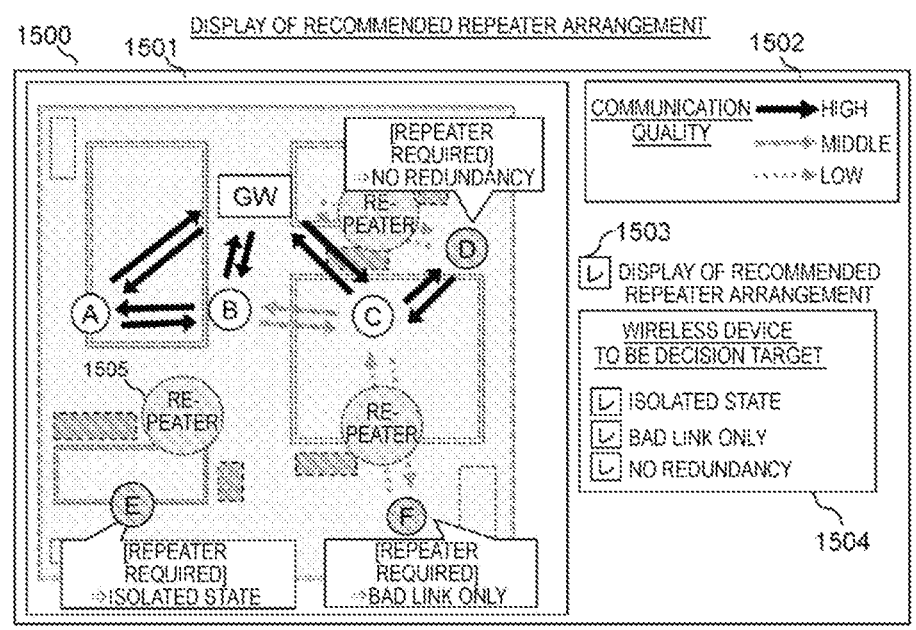

A display example of communication quality information and a recommended arrangement location of a repeater displayed on the display device 413 of the network management apparatus 400 will be described with reference to FIGS. 15A and 15B. FIGS. 15A and 15B illustrate a display screen 1500 displaying the communication quality information and the recommended arrangement location of a repeater in the communication system 1. In FIG. 15A, the display device 413 displays the display screen 1500, and a display area 1501 for displaying map information, the wireless device 200, and the like is provided in the display screen 1500. Communication quality information 1502 indicating a display example in which communication quality is classified into three levels (high, middle, and low), an item 1503 for changing display (on or off) of a recommended arrangement location of a repeater, and an item 1504 for changing the wireless device 200 to be a decision target ((1) an isolated state, (2) a bad link only, and (3) no redundancy) are provided in the display screen 1500.

As illustrated in FIG. 15A, it is possible to visually identify an overall configuration of a network and communication quality by displaying, on the display screen, the communication quality information between the wireless devices 200 and between the wireless device 200 and the gateway 300 regarding the display device 413, based on the neighboring terminal management table information collected from each wireless device 200 and gateway 300 managed by the network configuration management unit 406 of the network management apparatus 400. For example when the neighboring terminal management table information is not collected from the specific wireless device 200 and information about the specific wireless device 200 is not recorded in either of the neighboring terminal management tables 205 and 305 of the other wireless device 200 and the gateway 300, it is not possible to display communication quality information like "E" (the wireless device 200-E) of FIG. 15A, and thus an isolated state of communication unavailability may be easily identified.

In the example of FIG. 15A, the item 1503 is turned off and the communication quality is displayed by being classified in three levels. The displayed communication quality information may be arbitrarily set, for example, a latest value, a previously observed average value, a maximum value, a minimum value, or the like. It is not necessary to display level classification, and specific numerical value may be displayed. The timing of updating the displayed content may be when the network management apparatus 400 updated the management information of the network configuration management unit 406, when the operator updated the management information, or at arbitrary timing.

Next, a repeater arrangement decision result display example will be described with reference to FIG. 15B. When the item 1503 is turned on, the communication quality information managed by the network configuration management unit 406 and a repeater arrangement location 1505 that is a decision result of the repeater arrangement decision unit 409 are displayed in the display area 1501 as illustrated in FIG. 15B, in association with the wireless devices 200-A to 200-F (A to F) and the gateway 300 (GW). As such, by displaying the wireless devices 200 (E, D, and F) decided that a repeater is required to be added and a decision reason thereof (no redundancy, an isolated state, or ad link only), based on the decision result by the repeater necessity decision unit 407 of the network management apparatus 400, it is possible for the operator to visually identify which wireless device 200 requires a repeater to be added. By displaying the recommended repeater arrangement location 1505 calculated by the repeater arrangement decision unit 409, it is easily identified to where the wireless device 200 serving as a repeater is to be added.

Here, a case in which an arrangement location of a repeater is not restricted is assumed, but for example, even when a repeater is power-driven and is limited to being provided at a location where power supply is possible, or the like, the operator is able to determine to provide a repeater at a location closest to a displayed recommended arrangement location, among possible arrangement locations. When the possible arrangement locations of the repeater is known, a possible arrangement location closest to the recommended arrangement location of the repeater calculated by the repeater arrangement decision unit 409 may be explicitly displayed. In the example of FIGS. 15A and 15B, as a method of simplifying a screen when there is a plurality of wireless devices 200 and the display is complicated, the item 1503 for changing the display related to the recommended arrangement location of a repeater, the item 1504 for changing the wireless device 200 to be a decision target, and the like are described, but such functions may not be necessarily mounted.

As such, according to the current embodiment, the arrangement location of a repeater considering the radio wave propagation characteristic of the site may be calculated based on the information for managing the wireless multi-hop network and site configuration information, without requiring prior information about an arrangement location candidate of the repeater in the wireless multi-hop network. In particular, by deciding the wireless device 200 that require addition of a repeater and the appropriate connection destination, based on the neighboring terminal management table information collected from each wireless device 200 and the gateway 300 and the input site configuration information, and then deciding the arrangement location of the repeater required to connect the wireless device 200 decided that a repeater is required to be added and the connection destination and outputting the decided arrangement location as the recommended arrangement location of the repeater, it is possible to determine the arrangement location of the repeater based on the radio wave propagation characteristic of the site without requiring prior information about an arrangement location candidate of the repeater. Since it is not required to provide the wireless device 200 to all assumed arrangement location candidates of the repeater and measure connectivity, it is possible to reduce workload of engineering related to an arrangement design of the repeater. Since the operator without expert knowledge about wireless communication is able to identify an appropriate arrangement location via a repeater arrangement decision result output, it is possible for the operator to perform an engineering operation.

In the current embodiment, an example in which the repeater arrangement design is executed based on 2-dimensional (2D) site configuration information is described, but the site configuration information is not limited to 2D. When it is possible to input 3D site configuration information to the network management apparatus 400, it is possible, for example, to draw a tangent line and add a bypass in a vertical direction regarding 3D information of the obstacle, and consider in decision.

(2) Second Embodiment

In the first embodiment, the arrangement design of a repeater during network construction has been described, but there may be a case in which the repeater arrangement is redesigned due to a communication failure, such as disconnection of a communication link or the like, occurred by a change in site configuration or the like during network operation. Thus, in the current embodiment, the arrangement design of a repeater as a countermeasure against the communication failure occurred during the network operation will be described.

In the current embodiment, operation support of engineering in a wireless multi-hop network related to an arrangement design of a repeater is performed as a method different from the first embodiment illustrated in FIG. 6. Processing procedure related to the current embodiment will be described with reference to FIG. 16.

Figure 16:
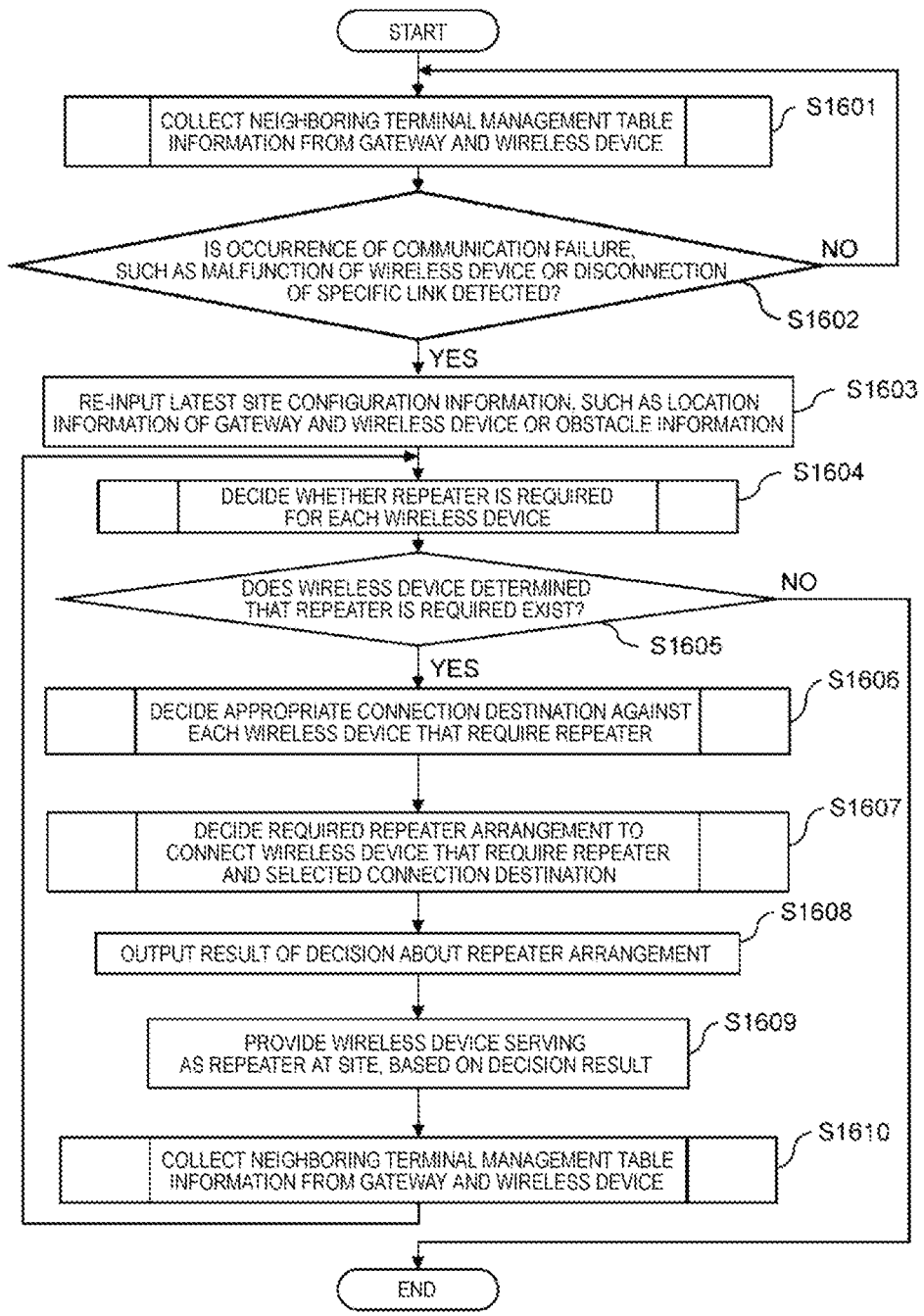
FIG. 16 is a flowchart illustrating main processes related to an arrangement design of a repeater according to a communication failure countermeasure according to a second embodiment.

FIG. 16 illustrates processing procedure related to main processes of engineering support in a wireless multi-hop network regarding a communication failure countermeasure, according to the current embodiment. Since various configurations and processes related to the current embodiment are the same as the first embodiment except for processes illustrated in FIG. 16, details thereof will be omitted.

In step S1601, the network management apparatus 400 collects information of the neighboring terminal management tables 205 and 305 from the gateway 300 and the wireless device 200. As in the first embodiment, the network management apparatus 400 manages the partner terminal communicable with the gateway 300 and the wireless device 200 and each communication quality, as the network configuration information, at the network configuration management unit 406. When step S1601 is completed, the network management apparatus 400 performs step S1602.

In step S1602, the network management apparatus 400 detects occurrence of a communication failure, such as malfunction of a wireless device, communication disconnection at a specific link, or the like. A method of detecting the occurrence of a communication failure may be arbitrarily set according to an application operated on the communication system. For example, the method may be performed based on communication quality in collected neighboring terminal management table information being below a predetermined value, collected data, such as a sensor value or the like being not collected continuously for a predetermined period of time by the collected data management unit 404 of the network management apparatus 400, or the like. When it is decided that the occurrence of the communication failure is detected (when YES), the network management apparatus 400 outputs an alarm and performs step S1603, and when it is decided that the occurrence of the communication failure is not detected (when NO), the network management apparatus 400 performs step S1601 to collect the neighboring terminal management table information again after a predetermined period of time. As such, by collecting the neighboring terminal management table information periodically also during the network operation and managing the configuration information frequently by the network configuration management unit 406, it is possible to monitor the occurrence of the communication failure.

In step S1603, when latest site configuration information, such as the location information of the gateway 300 and the wireless device 200, the obstacle information, and the like, is input through the input screen 700 illustrated in FIGS. 7A and 7B, the network management apparatus 400 obtains the corresponding information. Not all of the site configuration information are required to be re-obtained (re-input), but only information in which change is occurred may be obtained. When step S1603 is completed, the network management apparatus 400 performs step S1604.

In step S1604, the network management apparatus 400 decides the necessity of adding a repeater for each wireless device 200. Even when the wireless device 200 satisfied a predetermined communication requirement by the arrangement design of a repeater during the network construction, the wireless device 200 is decided as the wireless device 200 that require addition of a repeater via step S1604 when the communication requirement is not satisfied due to the occurrence of a communication failure. The repeater necessity decision process is the same as FIG. 10 according to the first embodiment. When step S1604 is completed, the network management apparatus 400 performs step S1605.

In step S1605, the network management apparatus 400 decides whether the wireless device 200 decided that a repeater is required to be added exists, based on a decision result of step S1604. When it is decided that the wireless device 200 decided that a repeater is required to be added exists (when YES), step S1606 is performed. On the other hand, when it is decided that the wireless device 200 does not exist (when NO), the network management apparatus 400 ends the main processes since all wireless devices 200 are able to achieve the predetermined communication requirement even after the occurrence of a communication failure and addition of a repeater is unnecessary.

In step S1606, the network management apparatus 400 decides the wireless device 200 or the gateway 300 serving as the appropriate connection destination against each wireless device 200 decided that a repeater is required in step S1604. Details about the connection destination decision process are the same as FIG. 11. When step S1606 is completed, the network management apparatus 400 performs step S1607.

In step S1607, the network management apparatus 400 decides the arrangement location of a repeater required to connect the wireless device 200 decided that a repeater is required in step S1604 and the connection destination decided in step S1606. Details about the repeater arrangement decision process are the same as FIG. 13. When step S1607 is completed, the network management apparatus 400 performs step S1608.

In step S1608, the network management apparatus 400 outputs a decision result obtained via the repeater arrangement decision unit 409 in step S1607 through the display device 413. The operator performing the communication failure countermeasure is able to identify where to add and provide the wireless device 200 serving as a repeater while attempting to recover the communication failure, by referring to an output result. When step S1608 is completed, the network management apparatus 400 performs step S1609.

In step S1609, the network management apparatus 400 detects that the operator performed the operation of providing the wireless device 200 serving as a repeater at the actual site, based on the repeater arrangement location decision result, displayed in step S1608. When completion of the providing is identified, the network management apparatus 400 performs S1610.

In step S1610, the network configuration management unit 406 collects the information of the neighboring terminal management tables 205 and 305 from the wireless device 200 and the gateway 300, as in step S1601. When step S1610 is completed, the network configuration management unit 406 performs step S1604 to decide the necessity of a repeater for each wireless device 200 again. By repeatedly performing the current process until the wireless device 200 decided that a repeater is required to be added does not exist, i.e., until the communication failure is recovered, it is possible to calculate the arrangement location of a required repeater as the communication failure countermeasure.

According to the current embodiment, when the communication failure is occurred in any wireless device 200 according to a change of site configuration during the network operation, the arrangement location of the required repeater may be calculated and suggested as the communication failure countermeasure, based on the latest site configuration information.

(3) Another Embodiment

In the above first and second embodiments, the present invention is applied to a communication system of a wireless multi-hop network, but the present invention is not limited thereto and may be widely applied to other several communication systems.

In the above first and second embodiments, the arrangement location of a repeater or the like is displayed, but the present invention is not limited thereto and may output the arrangement location of a repeater or the like as a file (data), on paper via printing, or in voice.

In the above first and second embodiments, step S1310 is performed when "bypass" is decided in step S1309 during the repeater arrangement decision process, but the present invention is not limited thereto, and when "bypass" is decided, the location of a repeater may be determined to be a location where neither of a line segment connecting a wireless device determined to require a repeater and the repeater and a line segment connecting the repeater and a connection destination obtained via a connection decision process crosses an obstacle, among an overlapping region of communication ranges.

In the above first and second embodiments, one of the processes of steps S1305, S1307, and S1308 is performed when "go straight" is decided in step S1303 during the repeater arrangement decision process, but the present invention is not limited thereto, and when "go straight" is decided, the location of a repeater may be determined to be a location where either or both of the line segment connecting the wireless device determined to require a repeater and the repeater and the line segment connecting the repeater and the connection destination obtained via the connection decision process cross the obstacle, among the overlapping region of the communication ranges.

The present invention is not limited to the above embodiment, and includes various modifications. It is possible to add, delete, or replace another configuration regarding a part of configuration of each embodiment.

Each of configurations, functions, and the like may be realized by hardware, for example, by designing a part or all thereof on an integrated circuit. Each of the configurations, functions, and the like may be realized by software as a processor interprets and executes a program realizing each function. Information, such as a program, a table, a file, or the like realizing each function, may be recorded on a recorded device, such as a memory, a hard disk, a solid state drive (SSD), or the like, or a recorded medium, such as an IC card, an SD card, a DVD, or the like.

What is claimed is:

1. A communication system including a plurality of devices capable of wireless multi-hop communication, and a network management apparatus comprising:
    a memory configured to store location information of each of the plurality of devices, site configuration information including location information and size information of an obstacle present at a site where the plurality of devices are provided, and communication quality information between devices of the plurality of devices;
    the memory storing instructions for execution by a processor, the processor executes: determining whether a repeater is required to be added for each of the plurality of devices, based on the communication quality information; and
    the memory storing instructions for execution by a processor, the processor executes: calculating an expected value related to attenuation of received power between a first device and a second device caused by the obstacle present at the site and decide a location at which the repeater is arranged, based on location information of the first device determined that the repeater is required to be added by the determination step, location information of the second device different from the first device and communicated with the first device through the repeater, the communication quality information between the first device and the second device, and the site configuration information.

2. The communication system according to claim 1, wherein
    when the obstacle exists between the first device and the second device, and the expected value related to the attenuation of the received power caused by the obstacle is equal to or greater than a threshold value in the received power between the first device and the second device, decides the location of the repeater to be a location within a communication range where a communication range of the first device and a communication range of the second device overlap and at which neither a line segment connecting the first device and the repeater nor a line segment connecting the repeater and the second device cross the obstacle.

3. The communication system according to claim 1, wherein
    when the obstacle exists between the first device and the second device, and the expected value related to the attenuation of the received power caused by the obstacle is less than a specified value in the received power between the first device and the second device, decides the location of the repeater to be a location within a communication range where a communication range of the first device and a communication range of the second device overlap and at which one or both of a line segment connecting the first device and the repeater and a line segment connecting the repeater and the second device cross the obstacle.

4. The communication system according to claim 3, wherein
    when the obstacle exists at a side of the first device regarding a midpoint of a line segment connecting the first device and the second device, decides the location of the repeater in a region of the side of the first device within the overlapping communication range, and when the obstacle exists at a side of the second device, decides the location of the repeater in a region of the side of the second device within the overlapping communication range.

5. The communication system according to claim 1, wherein
when there is no obstacle between the first device and the second device, decides the location of the repeater to be within a predetermined distance from a center of a communication range where a communication range of the first device and a communication range of the second device overlap.

6. The communication system according to claim 1, wherein
when there is no device that is able to directly communicate with the first device or when there is no device that is able to directly communicate with the first device except for a communication partner device that is able to directly communicate with the first device and has communication quality equal to or greater than a threshold value, selects a device in which an expected value related to attenuation of received power of the first device is minimum, as the second device.

7. The communication system according to claim 1, further comprising:
an output to a screen configured to output the location information of the location of the repeater decided.

8. The communication system according to claim 1, further comprising:
displaying an input screen capable of inputting the site configuration information including the location information and the size information of the obstacle present at the site according to a user operation.

9. The communication system according to claim 1, further comprising:
inputting the site configuration information including the location information and the size information of the obstacle present at the site; and
to detect an occurrence of a communication failure in the communication system, wherein
receives an input of the site configuration information, based on detection of the communication failure,
determines whether the repeater is required to be added for each of the plurality of devices, based on the communication quality information, and
calculates the expected value related to the attenuation of the received power between the first device and the second device caused by the obstacle present at the site and decides the location at which the repeater is arranged, based on the location information of the first device determined that the repeater is required to be added, the location information of the second device different from the first device and communicated with the first device through the repeater, the communication quality information between the first device and the second device, and the site configuration information that is input.

10. A communication management method of a communication system including a plurality of devices capable of wireless multi-hop communication and a storage unit configured to store location information of each of the plurality of devices, site configuration information including location information and size information of an obstacle present at a site where the plurality of devices are provided, and communication quality information between devices of the plurality of devices, the communication management method comprising:
determining, by a determination unit, whether a repeater is required to be added for each of the plurality of devices based on the communication quality information; and
calculating, by a decision unit, an expected value related to attenuation of received power between a first device and a second device caused by the obstacle present at the site and deciding, by the decision unit, a location at which the repeater is arranged, based on location information of the first device determined that the repeater is required to be added by the determination unit, location information of the second apparatus different from the first device and communicated with the first device through the repeater, the communication quality information between the first device and the second device, and the site configuration information.

11. A network management apparatus for managing a network configured by including a plurality of devices capable of wireless multi-hop communication, the network management apparatus comprising:
a memory configured to store location information of each of the plurality of devices, site configuration information including location information and size information of an obstacle present at a site where the plurality of devices are provided, and communication quality information between devices of the plurality of devices;
the memory storing instructions for execution by a processor, the processor executes: determining whether a repeater is required to be added for each of the plurality of devices, based on the communication quality information; and
the memory storing instructions for execution by a processor, the processor executes: calculating an expected value related to attenuation of received power between a first device and a second device caused by the obstacle present at the site and decide a location at which the repeater is arranged, based on location information of the first device determined that the repeater is required to be added by the determination step, location information of the second device different from the first device and communicated with the first device through the repeater, the communication quality information between the first device and the second device, and the site configuration information.

* * * * *